(12) United States Patent
Sasaki

(10) Patent No.: US 6,342,990 B1
(45) Date of Patent: Jan. 29, 2002

(54) METHOD FOR FORMING MAGNETIC POLE LAYER OF THIN FILM MAGNETIC HEAD, THIN FILM MAGNETIC HEAD AND METHOD FOR MANUFACTURING THE SAME

(75) Inventor: Yoshitaka Sasaki, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/332,496

(22) Filed: Jun. 14, 1999

(51) Int. Cl.[7] ............................................... G11B 5/147
(52) U.S. Cl. ...................................................... 360/126
(58) Field of Search ................................ 360/126, 121; 29/603

(56) References Cited

U.S. PATENT DOCUMENTS 5,438,747 A    8/1995   Krounbe et al. .............. 29/603

FOREIGN PATENT DOCUMENTS

JP      7-262519      10/1995
JP      9-180127      7/1997

*Primary Examiner*—Allen Cao
(74) *Attorney, Agent, or Firm*—Oliff & Berridge, PLC

(57) ABSTRACT

It is an object of the invention to make it possible to control the width of a magnetic pole of a thin film magnetic head accurately. According to a method for manufacturing a thin film magnetic head of the invention, a reflection preventing film having conductivity and having a function of preventing the reflection of light for exposure at photolithography is formed on an electrode film used for forming a top magnetic pole layer by performing of a plating process using a photoresist pattern as a mask; a photoresist pattern for forming the top magnetic pole layer is formed on the reflection preventing film using photolithography; and the top magnetic pole layer is formed by performing of a plating process using the photoresist pattern as a mask.

43 Claims, 18 Drawing Sheets

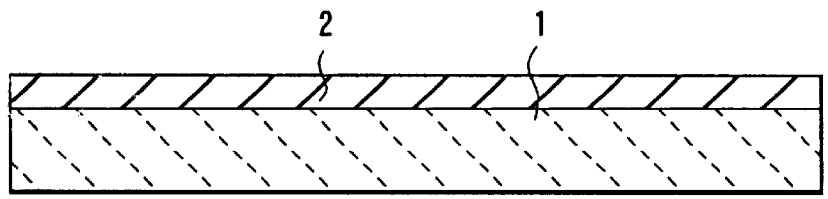 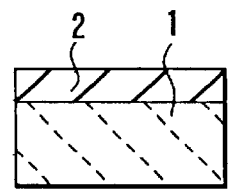
FIG. 1A    FIG. 1B
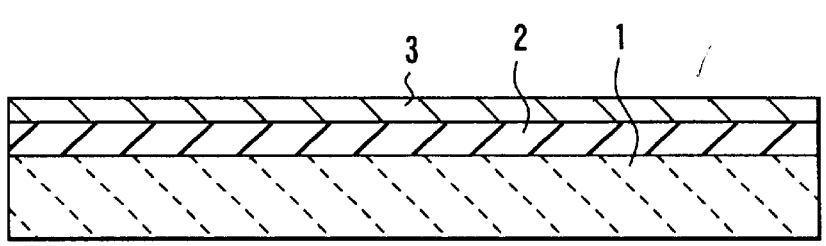 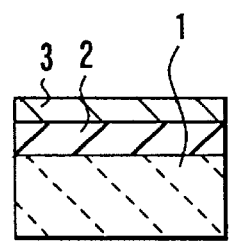
FIG. 2A    FIG. 2B
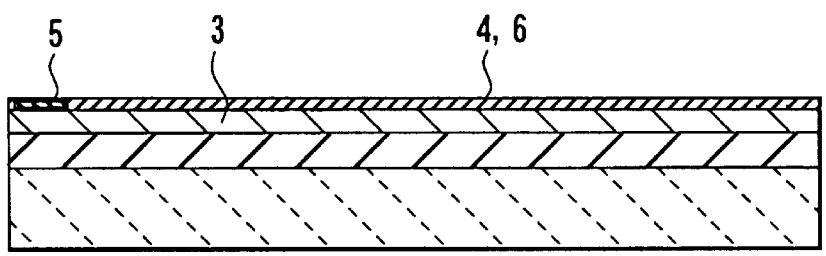 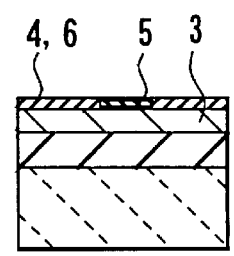
FIG. 3A    FIG. 3B

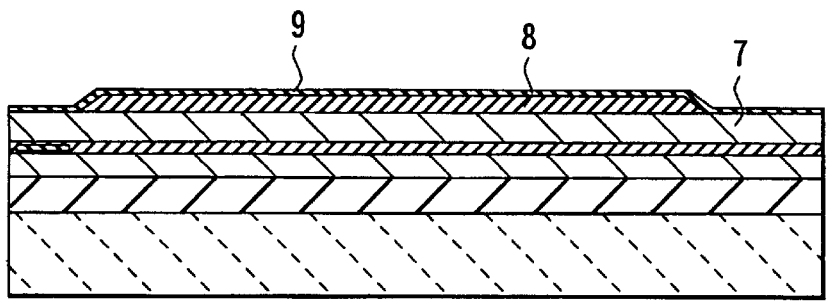 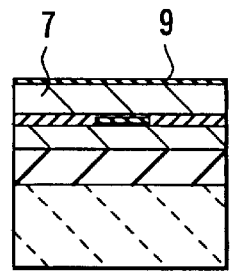
FIG. 4A  FIG. 4B
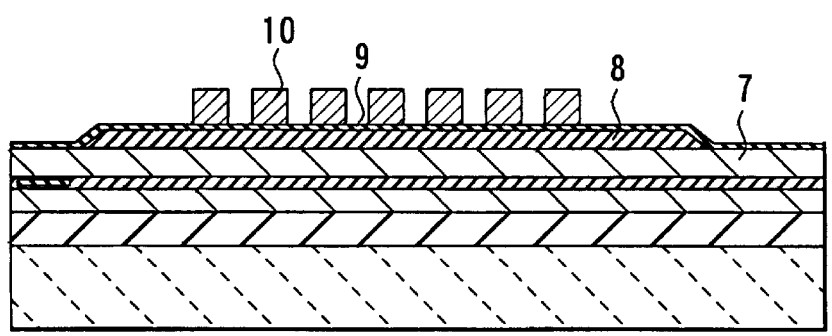 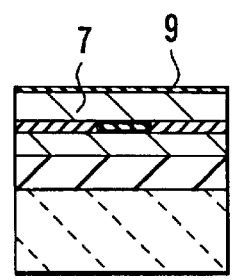
FIG. 5A  FIG. 5B

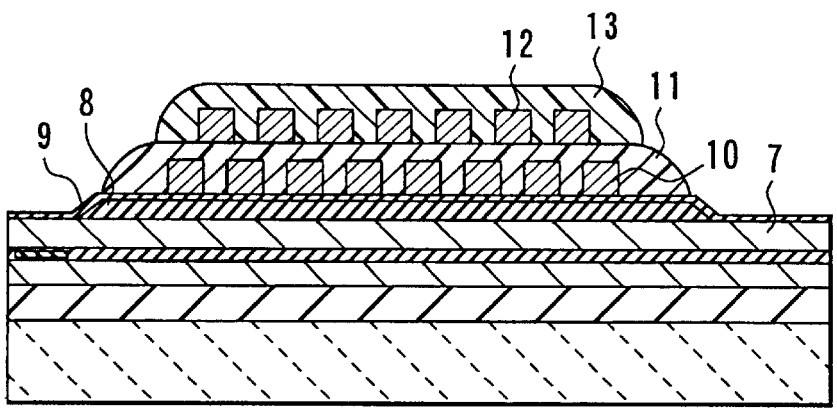 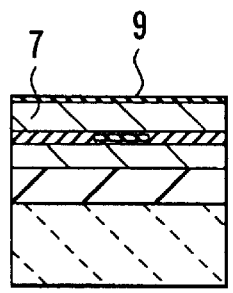
FIG. 6A          FIG. 6B
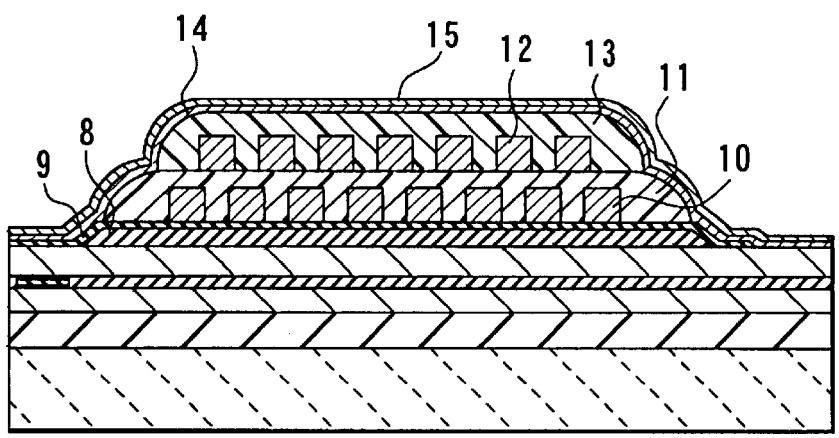 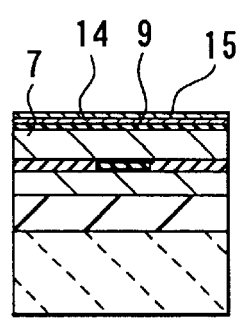
FIG. 7A          FIG. 7B

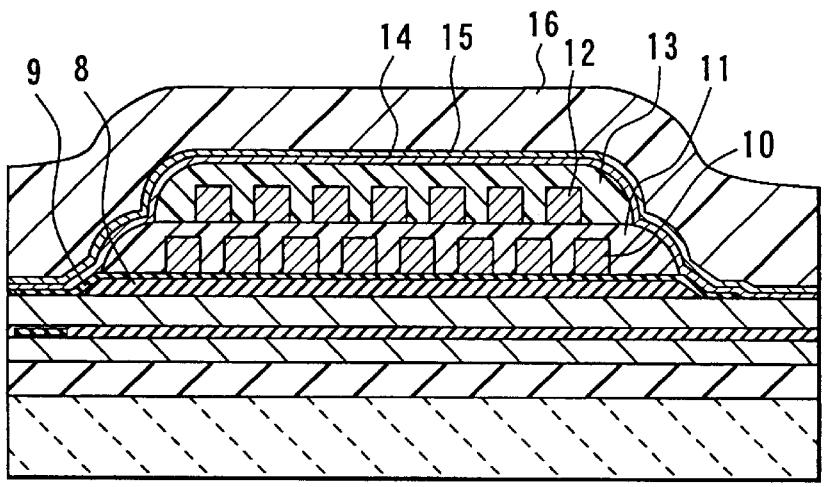
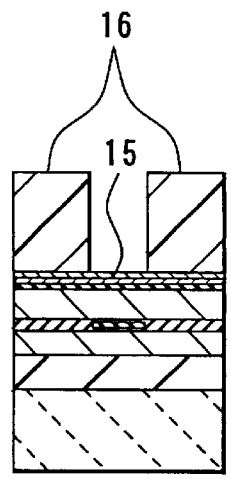
FIG. 8A  FIG. 8B
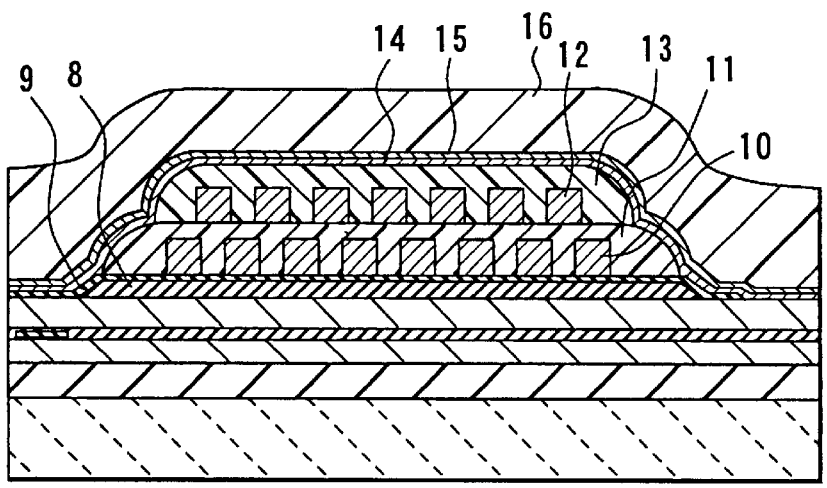
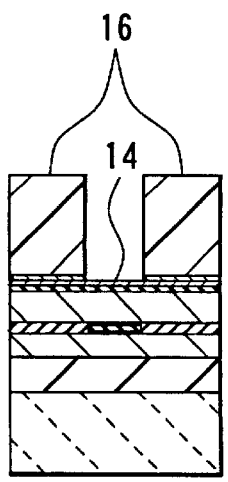
FIG. 9A  FIG. 9B

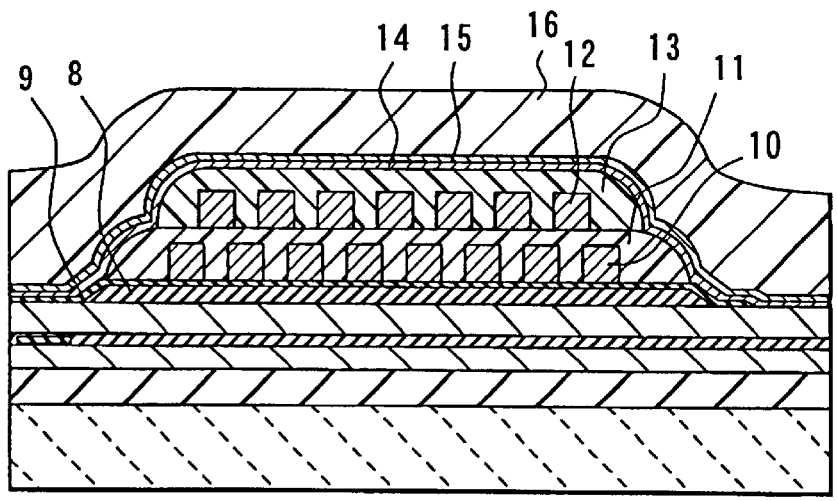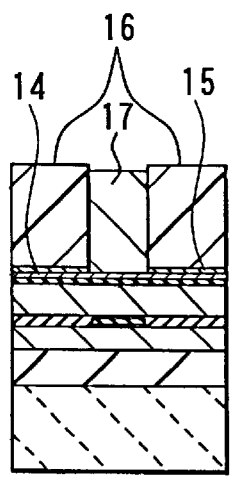
FIG. 10A  FIG. 10B
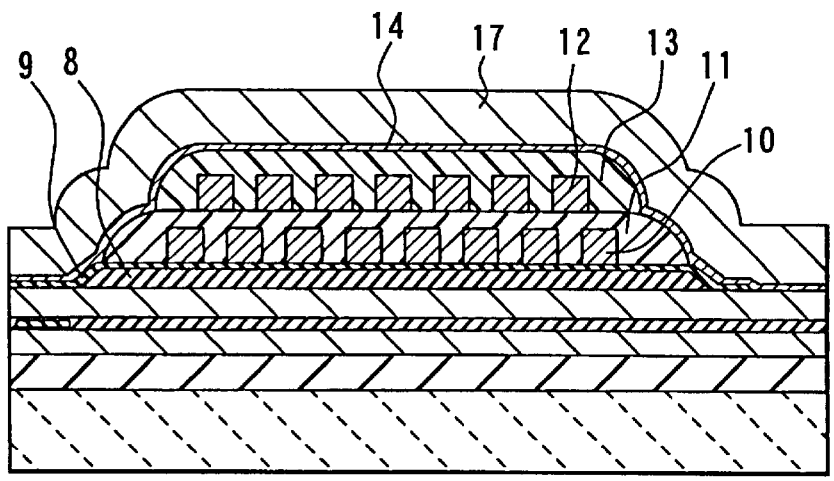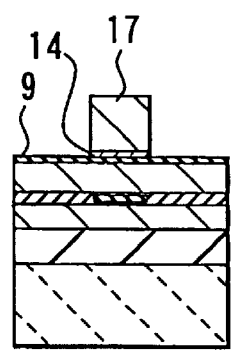
FIG. 11A  FIG. 11B

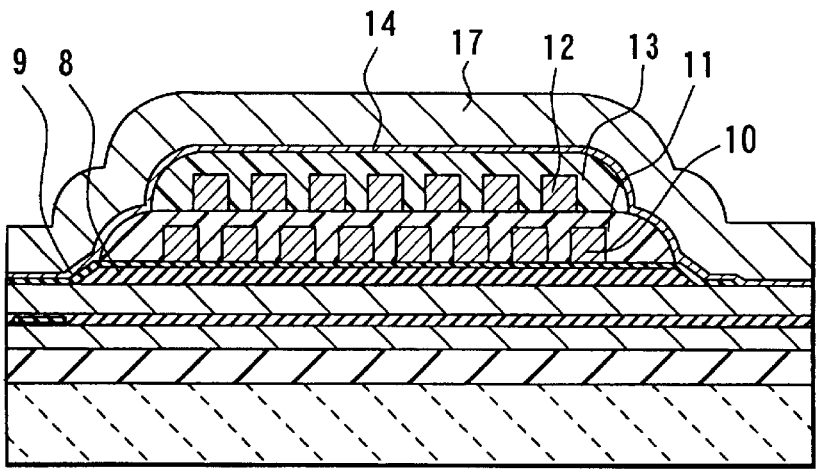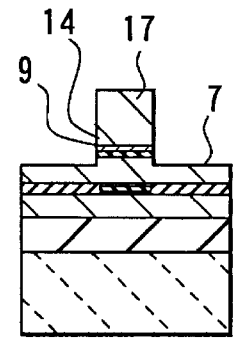
FIG. 12A    FIG. 12B
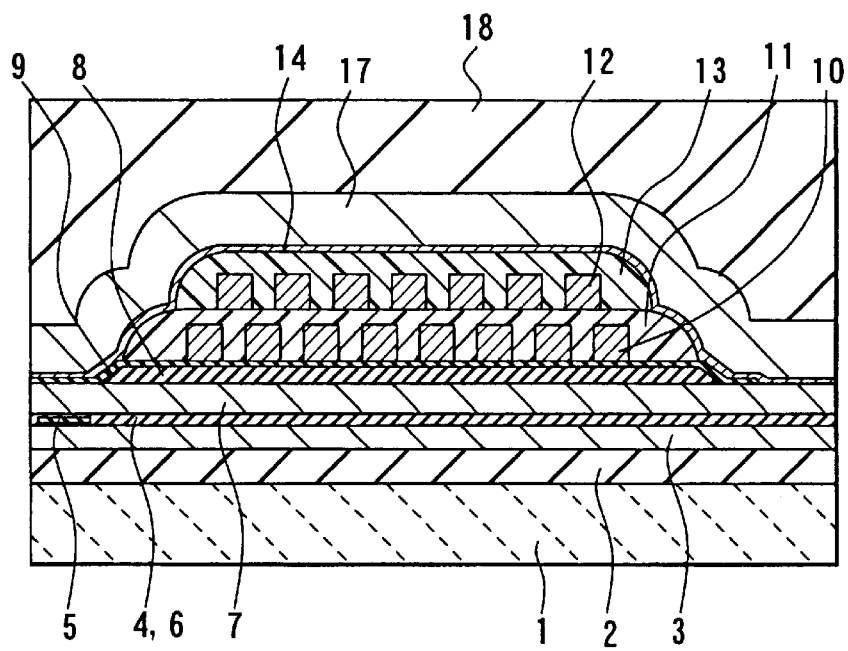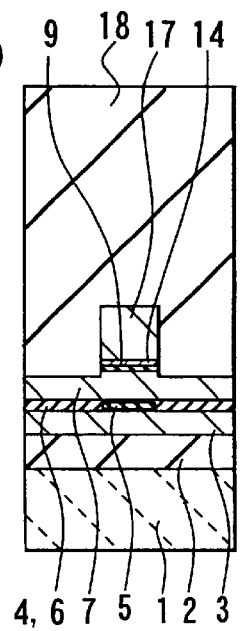
FIG. 13A    FIG. 13B

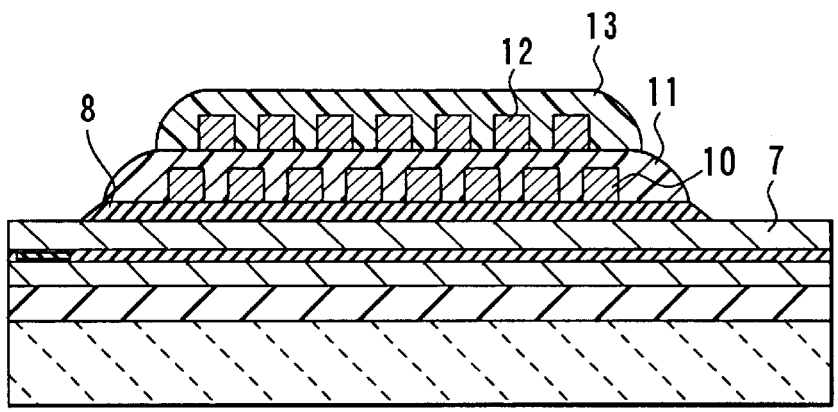 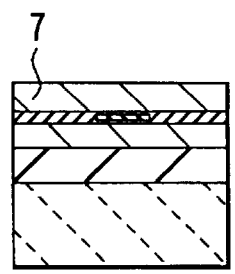
FIG. 19A    FIG. 19B
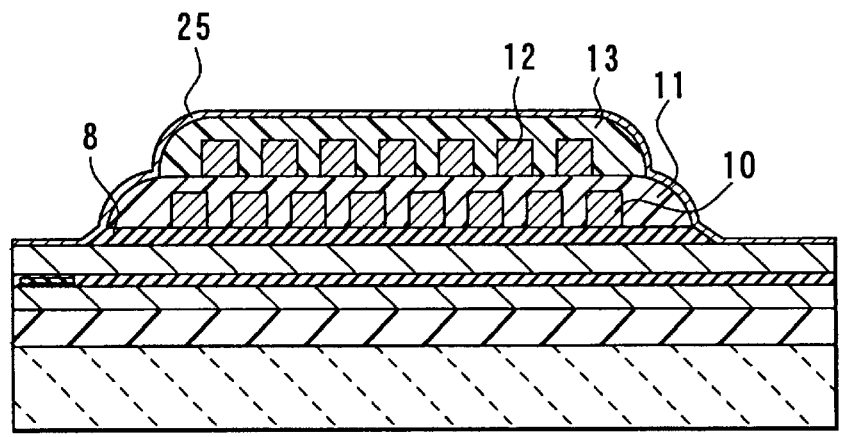 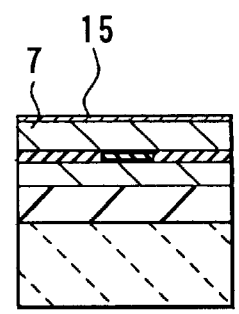
FIG. 20A    FIG. 20B

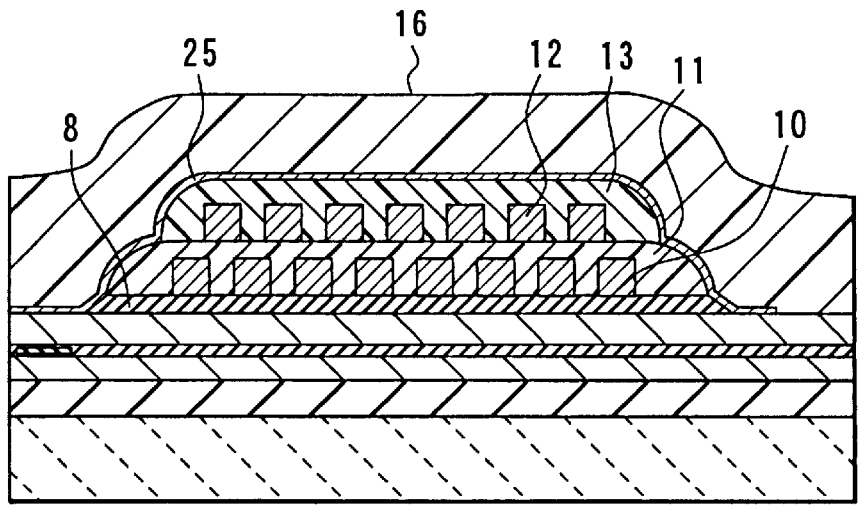 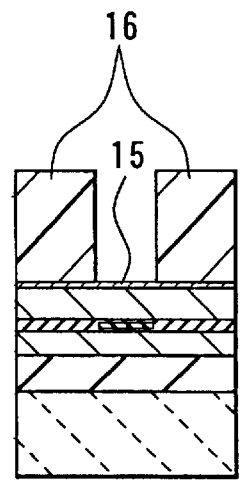
FIG. 21A  FIG. 21B
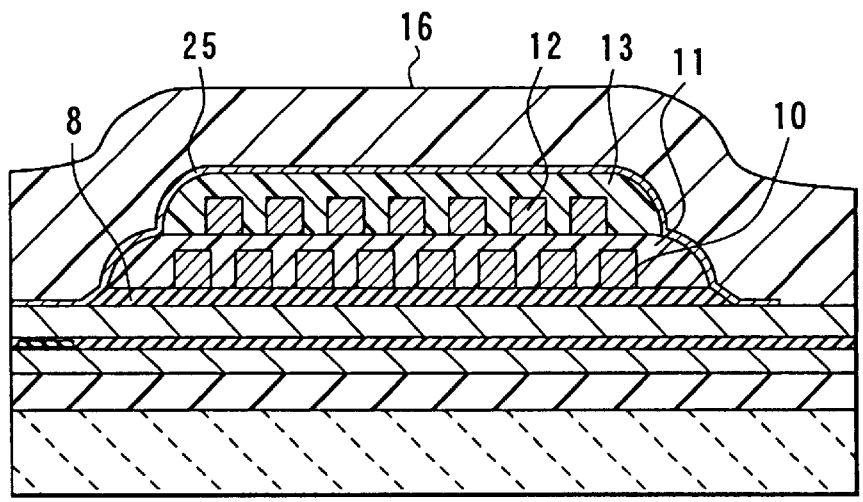 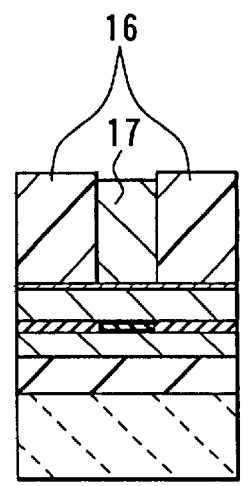
FIG. 22A  FIG. 22B

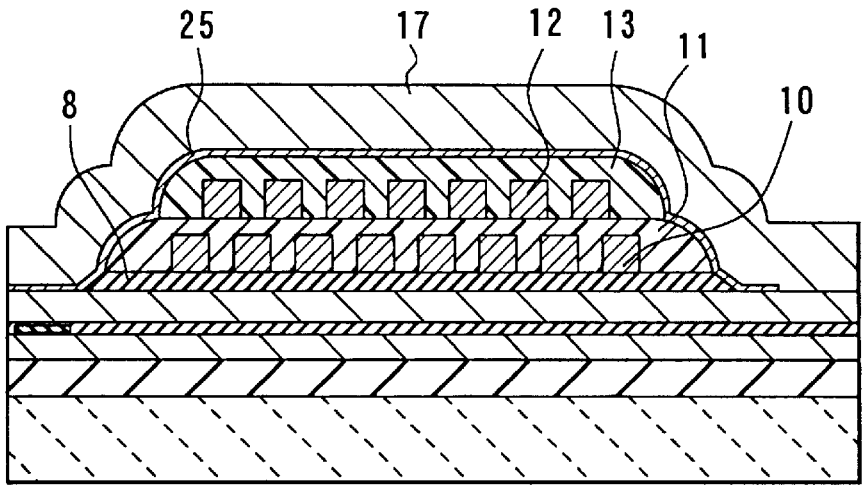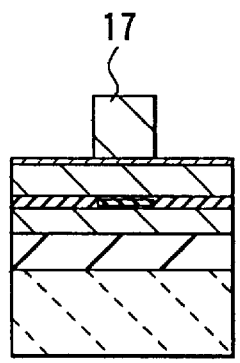
FIG. 23A　　　　FIG. 23B
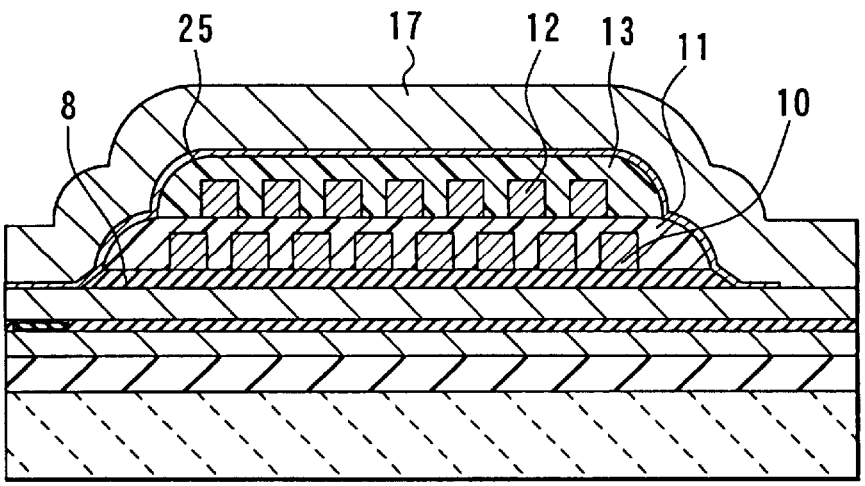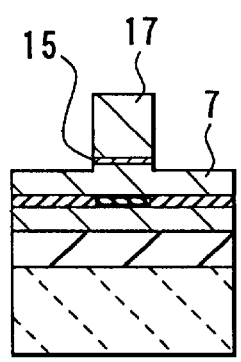
FIG. 24A　　　　FIG. 24B

METHOD FOR FORMING MAGNETIC POLE LAYER OF THIN FILM MAGNETIC HEAD, THIN FILM MAGNETIC HEAD AND METHOD FOR MANUFACTURING THE SAME

BACKGROUND OF THE INVENTION

1. Field of the Invention

The present invention relates to a method for forming a magnetic pole layer of a thin film magnetic head having at least an induction type magnetic transducer, a thin film magnetic head and a method for manufacturing the same.

2. Description of the Related Art

Recent improvement of the surface recording density of hard disk drives has resulted in demands for improved performance of thin film magnetic heads. Commonly used thin film magnetic heads are composite thin film magnetic heads having a structure in which a recording head having an induction type magnetic transducer for writing and a reproduction head having a magnetoresistive (hereinafter referred to as "MR") element for reading are stacked into layers. MR elements include AMR elements utilizing the anisotropic magnetoresistive (hereinafter referred to as "AMR") effect and GMR elements utilizing the giant magnetoresistive (hereinafter referred to as "GMR") effect. A reproduction head utilizing an AMR element is referred to as "AMR head" or simply as "MR head", and a reproduction head utilizing a GMR element is referred to as "GMR head". An AMR head is used as a reproduction head having a surface recording density in the excess of 1 gigabit/inch$^2$, and a GMR head is used as a reproduction head having a surface recording density in the excess of 3 gigabit/inch$^2$.

An AMR head has an AMR film having the AMR effect. A GMR head has the same structure as that of an AMR head except that the AMR film is replaced with a GMR film having the GMR effect. When exposed to the same external magnetic field, the resistance of a GMR film changes more significantly than that of an AMR film. Therefore, it is said that the reproduction output of a GMR head can be about 3 to 5 times greater than that of an AMR head.

One method for improving the performance of a reproduction head is to change the MR film. In general, an AMR film is a film which is made of a magnetic material having the MR effect and which has a single-layer structure. On the contrary, most GMR films have a multi-layer structure which is a combination of a plurality of films. The GMR effect produces several types of mechanisms, and the layer structures of GMR films depend on the mechanisms. GMR films proposed in the past include superlattice GMR films, granular films and spin valve films, and spin valve films are promising as GMR films which must have a relatively simple configuration, which must exhibit significant fluctuation of resistance even in a weak magnetic field and which are to be mass-produced. Therefore, the purpose of improving the performance of a reproduction head can be easily achieved by, for example, changing the material of the MR film from an AMR film to a GMR film or the like having excellent sensitivity to magnetoresistance.

Factors that determine the performance of a reproduction head other than the choice of the material as described above include the pattern widths, especially MR height. MR height is the length (height) of an MR element from the end thereof where the air bearing surface (surface facing the medium) is located to the opposite end thereof. The MR height is essentially controlled by the amount of lapping during the processing of the air bearing surface.

The trend toward reproduction heads having improved performance has resulted in a need for improvement of recording heads. In order to improve the performance of a recording head especially the recording density, the track density of the magnetic recording medium must be increased. For this purpose, it has been desired to provide a recording head having a narrow track structure by processing a magnetic layer for forming an top magnetic pole on a submicron basis utilizing semiconductor processing techniques.

Another factor that determines the performance of a recording head is the throat height. Throat height is the length (height) of a region that extends from the air bearing surface to an edge of an insulation layer for electrically isolating a thin film coil (the region is referred to as "magnetic pole portion" in this application). There is a need for a reduction of the throat height to improve the performance of a recording head. The throat height is also controlled by the amount of lapping during the processing of the air bearing surface.

As described above, in order to improve the performance of a thin film magnetic head, it is important to form the recording and reproduction heads with preferable balance between them.

A description will now be made with reference to FIGS. 26 through 36 on an example of a method for manufacturing a composite thin film magnetic head according to the related art. FIGS. 26 through 36 show a section perpendicular to an air bearing surface.

According to the manufacturing method, as shown in FIG. 26, an insulation layer 102 made of, for example, alumina (Al$_2$O$_3$) is deposited on a substrate 101 made of, for example, aluminum oxide and titanium carbide (Al$_2$O$_3$.TiC) to a thickness in the range from about 5 to 10 µm. Next, as shown in FIG. 27, a bottom shield layer 103 for a reproduction head is formed on the insulation layer 102.

As shown in FIG. 28, for example, alumina is then deposited on the bottom shield layer 103 to a thickness in the range from 100 to 200 nm by means of sputtering to form a shield gap film 104. Then, an MR film 105 for forming an MR element for reproduction is formed on the shield gap film 104 to a thickness of several tens nm and is patterned into a desired configuration using photolithography with high accuracy. As shown in FIG. 29, a shield gap film 106 is then formed on the shield gap film 104 and MR film 105 to embed the MR film 105 between the shield gap films 104 and 106.

Next, as shown in FIG. 30, a tom shield layer-cum-bottom magnetic pole layer (hereinafter referred to as "bottom magnetic pole layer") 107 made of a magnetic material, e.g., permalloy (NiFe) to be used for both of reproduction and recording heads is formed on the shield gap film 106.

As shown in FIG. 31, a recording gap layer 108 constituted by an insulation film, e.g., an alumina film, is then formed on the bottom magnetic pole layer 107, and a photoresist layer 109 is formed on the recording gap layer 108 in a predetermined pattern using photolithography with high accuracy. Next, a first layer thin film coil 110 for an induction type recording head made of, for example, copper (Cu) is formed on the photoresist layer 109 using a plating process.

Next, as shown in FIG. 32, a photoresist layer 111 is formed on the photoresist layer 109 and coil 110 in a predetermined pattern using photolithography with high accuracy. Then, a heating process is performed at a temperature of, for example, 250° C. to planarize the photoresist layer 111 and to provide insulation at the gaps of the coil 110.

Next, as shown in FIG. 33, a second layer thin film coil 112 made of, for example, copper is formed on the photoresist layer 111 using, for example, a plating process. Then, a photoresist layer 113 is formed on the photoresist layer 111 and coil 112 in a predetermined pattern using photolithography with high accuracy, and a heating process is performed at a temperature of, for example, 250° C. to planarize the photoresist layer 113 and to provide insulation at the gaps of the coil 112.

Next, as shown in FIG. 34, the recording gap layer 108 is partially etched for forming a magnetic path in a position behind (right-hand side in FIG. 34) the coils 110 and 112. Then, a top magnetic pole layer 114 made of a magnetic material, e.g., permalloy, for the recording head is formed on the recording gap layer 108 and photoresist layers 109, 111 and 113. The top magnetic pole layer 114 is in contact with the bottom magnetic pole layer 107 in a position behind the coils 110 and 112 to be magnetically coupled therewith. Next, the recording gap layer 108 and bottom magnetic pole layer 107 are etched by about 0.5 $\mu$m by means of ion milling using the top magnetic pole layer 114 as a mask, and an overcoat layer 115 made of, for example, alumina is formed on the top magnetic pole layer 114. Finally, mechanical processing of a slider is performed to form an air bearing surface 120 of the recording and reproduction heads, which completes a thin film magnetic head.

FIGS. 35 and 36 show the completed thin film magnetic head. FIG. 35 shows a section of the thin film magnetic head perpendicular to the air bearing surface 120, and FIG. 36 shows an enlarged view of a section of the magnetic pole portion parallel with the air bearing surface 120. In FIG. 35, TH represents the throat height, and MR-H represents the MR height. In FIG. 36, P2W represents the width of the magnetic pole, and P2L represents the thickness of the magnetic pole portion.

Factors that determine the performance of a thin film magnetic head other than the throat height, MR height and the like include an apex angle as indicated by $\theta$ in FIG. 35. The apex angle is an angle defined by a straight line connecting the corners of the photoresist layers 109, 111 and 113 at the side thereof closer to the air bearing surface and the upper surface of the top magnetic pole layer 114.

The structure as shown in FIG. 36 in which the side walls of the top magnetic pole layer 114, recording gap layer 108 and a part of the bottom magnetic pole layer 107 are formed in self-alignment with each other in the vertical direction is referred to as "trim structure". The trim structure makes it possible to prevent any increase in the effective track width attributable to the expansion of magnetic flux that occurs during writing of the narrow track. As shown in FIG. 36, lead layers 121 are provided on both sides of the MR film 105.

A composite thin film magnetic head manufactured as described above has many problems associated with especially the positional relationship between the recording head and reproduction head, and such problems have often resulted in deterioration of the characteristics and reliability of the composite thin film magnetic head as a whole and have reduced the yield significantly.

In order to improve the performance of a thin film magnetic head, it is important to accurately define the throat height TH, MR height MR-H, apex angle $\theta$, magnetic pole width P2W and magnetic pole length P2L.

The present application addresses especially a problem associated with the accurate control of the magnetic pole width P2W (hereinafter referred to as "first problem") and a problem associated with the accurate control of the throat height TH (hereinafter referred to as "second problem").

The first problem will now be described. The magnetic pole width P2W must be defined accurately to determine the track width of a recording head. Especially, dimensions on the order of 1.0 $\mu$m or less are required in these days to allow recording at a high surface recording density, i.e., to form recording heads having a narrow track structure. For this purpose, the top magnetic pole layer that determines the magnetic pole width P2W must be finely formed.

The top magnetic pole layer is formed using, for example, a frame plating process as disclosed in Japanese Patent Laid-Open Publication No. 7-262519. When the top magnetic pole layer 114 is formed using the frame plating process, sputtering is performed to form a thin electrode film made of, for example, permalloy on a coil portion (hereinafter referred to as "apex portion") which is covered by the photoresist layers 109, 111 and 113 to be built up in the form of a mound. Next, photoresist is applied thereon and is patterned using photolithography to form a frame (outer frame) for plating. The top magnetic pole layer is then formed using a plating process using the previously formed electrode layer as a seed layer.

The apex portion has a height difference of, for example, 7 to 10 $\mu$m or more. The photoresist is applied on the apex portion to a thickness in the range from 3 to 4 $\mu$m. When the photoresist on the apex portion must have a thickness of at least 3 $\mu$m, since the photoresist which has fluidity tends to concentrate at the lower region, a photoresist film having a thickness, for example, of 8 to 10 $\mu$m or more is formed at the lower region of the apex portion.

As described above, a pattern having a width of about 1.0 $\mu$m must be formed from a photoresist film in order to form a narrow track. It is therefore necessary to form a fine pattern having a width of about 1.0 $\mu$m from a photoresist film having a thickness of 8 to 10 $\mu$m or more, which has been quite difficult.

In addition, light for exposure at the photolithography is reflected by the electrode film made of permalloy, and the photoresist is sensitive also to this reflected light, which causes breakage of the photoresist pattern and the like. As a result, the top magnetic pole layer can not be formed into the desired configuration. For example, the side walls of the top magnetic pole layer will be in a roundish configuration. According to the related art, it is quite difficult as described above to form a top magnetic pole layer for providing a narrow track structure accurately by controlling the magnetic pole width accurately.

When the top magnetic pole layer is formed using the frame plating process, a problem arises in that the top magnetic pole layer may be difficult to form accurately and may become ununiform in its composition in narrow regions such as regions in the vicinity of boundaries between the side walls of the photoresist pattern and the electrode film.

Japanese Patent Laid-Open Publication No. 9-180127 discloses a technique wherein a reflection preventing film is formed before photoresist to serve as a core mask is applied and wherein the photoresist is applied on the reflection preventing film to make it possible to form a core mask with high dimensional accuracy that is free from the influence of reflected light.

However, this technique is still unable to solve the problem in that the top magnetic pole layer may be difficult to form accurately and may become ununiform in its composition in narrow regions.

Further, according to the above-described technique, it is necessary to remove the reflection preventing film in the region where the top magnetic pole layer is to be formed after the photoresist pattern is formed and before the top magnetic pole layer is formed using a plating process. This increases the number of steps for manufacturing a thin film magnetic head, and the reflection preventing film may be partially left instead of being accurately removed to make it impossible to form the top magnetic pole layer accurately in narrow regions.

A description will now be made on the second problem (the problem of accurate control of the throat height TH). In the method for manufacturing a thin film magnetic head according to the related art, a heating process at a temperature of about 250° C. is performed to form the coils 110 and 112. At this heating step, the photoresist layers 109, 111 and 113 melt to cause positional fluctuation of the edges of the photoresist layers 109, 111 and 113 (pattern shift) and deterioration of the profiles of them. Especially, the positional fluctuation is significant because the photoresist layers 109, 111 and 113 are formed with a great thickness.

There is a need for smaller throat heights in order to improve the performance of recording heads and, especially, throat heights of 1.0 μm or less are required for composite thin film magnetic heads for high frequencies in the future. However, in the case of a thin film magnetic head according to the related art, since the throat height is determined by the edge of the photoresist layer 109 at the side of the magnetic pole portion, any positional fluctuation of the edge of the photoresist layer 109 results in the problem of inability to control the throat height accurately as described above.

Further, any positional fluctuation of the edges of the photoresist layers 109, 111 and 113 results in a problem in that the MR height can not be accurately controlled, for example, when the MR height is controlled relative to the position of the edge of the photoresist layer 109 as a reference during the processing of the air bearing surface.

The MR height can be accurately controlled by processing the air bearing surface while monitoring the resistance of the MR film 105. While the throat height can be controlled by converting the resistance of the MR film 105 into the throat height, in order to control the throat height accurately, no error should occur in alignment between the MR film 105 and photoresist layer 109. When there is positional fluctuation of the edges of the photoresist layers 109, 111 and 113 as described above, it is not possible to control the throat height accurately by converting the resistance of the MR film 105 into the throat height.

Further, when there is positional fluctuation of the edges of the photoresist layers 109, 111 and 113 and there is deterioration of the profiles thereof, a problem arises in that the apex angle can not be accurately controlled because the apex angle fluctuates.

In the method for manufacturing a thin film magnetic head according to the related art, the photoresist layer 109 that determines the throat height is etched when the seed layer is etched during the formation of the coils 110 and 112 using a plating process and when the recording gap layer 108 and bottom magnetic pole layer 107 are etched to form the trim structure. This results in a phenomenon that the position of the edge of the photoresist layer 109 at the side of the magnetic pole portion moves back a distance of about 1 to 2 μm, which also leads to the problem in that the accurate control of the throat height becomes difficult.

OBJECTS AND SUMMARY OF THE INVENTION

It is a first object of the invention to provide a method for forming a magnetic pole layer of a thin film magnetic head in which the width of a magnetic pole can be accurately controlled, a thin film magnetic head and a method for manufacturing the same.

It is a second object of the invention to provide a thin film magnetic head in which accurate control of a throat height can be achieved in addition to the first object and to provide a method for manufacturing the same.

A method for forming a magnetic pole layer of a thin film magnetic head according to the invention is a method for forming either of two magnetic pole layers, i.e., first and second magnetic pole layers of a thin film magnetic head comprising first and second magnetic pole layers which are magnetically coupled to each other, which include magnetic pole portions being opposite to each other and being placed in regions of the magnetic pole layers on the side of surfaces thereof facing a recording medium and which are each constituted by at least one layer, a gap layer provided between the magnetic pole portion of the first magnetic pole layer and the magnetic pole portion of the second magnetic pole layer and a thin film coil provided such that at least a part thereof is interposed between the first and second magnetic pole layers in a state of insulation from the first and second magnetic pole layers, the method including the steps of:

forming an electrode film used for forming the magnetic pole layer;

forming a reflection preventing film which is conductive and which has a function of preventing reflection of light for exposure at photolithography on the electrode film;

forming a photoresist pattern for forming the magnetic pole layer on the reflection preventing film using photolithography; and forming the magnetic pole layer using the photoresist pattern as a mask.

According to the method for forming a magnetic pole layer of a thin film magnetic head of the invention, the reflection of light for exposure at photolithography is prevented by a reflection preventing film. Further, according to the invention, since the reflection preventing film is conductive, the reflection preventing film functions as at least a part of an electrode for forming one of magnetic pole layers, which makes it possible to form the magnetic pole layer accurately even in narrow regions.

A first method for manufacturing a thin film magnetic head according to the invention is a method for manufacturing a thin film magnetic head comprising first and second magnetic pole layers which are magnetically coupled to each other, which include magnetic pole portions being opposite to each other and being placed in regions of the magnetic pole layers on the side surfaces thereof facing a recording medium and which are each constituted by at least one layer, a gap layer provided between the magnetic pole portion of the first magnetic pole layer and the magnetic pole portion of the second magnetic pole layer and a thin film coil provided such that at least a part thereof is interposed between the first and second magnetic pole layers in a state of insulation from the first and second magnetic pole layers, the method including the steps of:

forming the first magnetic pole layer;

forming the gap layer on the first magnetic pole layer;

forming the thin film coil on the first magnetic pole layer in an insulated state; and forming the second magnetic pole layer on the thin film coil in an insulated state, the step of forming the second magnetic pole layer including the steps of:
    forming an electrode film used for forming the second magnetic pole layer;
    forming a reflection preventing film which is conductive and which has a function of preventing reflection of light for exposure at photolithography on the electrode film;
    forming a photoresist pattern for forming the second magnetic pole layer on the reflection preventing film using photolithography; and
    forming the second magnetic pole layer using the photoresist pattern as a mask.

According to the first method for manufacturing a thin film magnetic head of the invention, the reflection of light for exposure at photolithography is prevented by a reflection preventing film. Further, according to the invention, since the reflection preventing film is conductive, the reflection preventing film functions as at least a part of an electrode for forming a second magnetic pole layer, which makes it possible to form the magnetic pole layer accurately even in narrow regions.

The method for forming a magnetic pole layer of a thin film magnetic head or the first method for manufacturing a thin film magnetic head according to the invention may include the step of removing the reflection preventing film using the photoresist pattern as a mask. In this case, for example, reactive ion etching is used at the step of removing the reflection preventing film.

In the method for forming a magnetic pole layer of a thin film magnetic head or the first method for manufacturing a thin film magnetic head according to the invention, the reflection preventing film may be made of a non-magnetic material, e.g., a non-magnetic nitride such as titanium nitride.

In the method for forming a magnetic pole layer of a thin film magnetic head or the first method for manufacturing a thin film magnetic head according to the invention, one of the magnetic pole layers or the second magnetic pole layer may be formed on the reflection preventing film at the step of forming one of the magnetic pole layers or the second magnetic pole layer. Further, according to the method for forming a magnetic pole layer of a thin film magnetic head of the invention, the reflection preventing film may be made of a magnetic material.

The first method for manufacturing a thin film magnetic head according to the invention may further include the step of forming an insulation layer made of an inorganic insulating material for defining a throat height on the first magnetic pole layer, and the thin film coil may be formed on the insulation layer.

The first method for manufacturing a thin film magnetic head according to the invention may further include the step of forming a magnetoresistive element for reading.

A first thin film magnetic head according to the invention comprises:
    first and second magnetic pole layers which are magnetically coupled to each other, which include magnetic pole portions being opposite to each other and being placed in regions of the magnetic pole layers on the side of surfaces thereof facing a recording medium and which are each constituted by at least one layer;
    a gap layer provided between the magnetic pole portion of the first magnetic pole layer and the magnetic pole portion of the second magnetic pole layer;
    a thin film coil provided such that at least a part thereof is interposed between the first and second magnetic pole layers in a state of insulation from the first and second magnetic pole layers; and
    a reflection preventing film which is provided between the gap layer and the second magnetic pole layer, which is conductive and which has a function of preventing the reflection of light for exposure at photolithography.

During the manufacture of the first thin film magnetic head according to the invention, the reflection preventing film prevents the reflection of light for exposure at photolithography. Further, according to the invention, since the reflection preventing film is conductive, the reflection preventing film functions as at least a part of an electrode for forming the second magnetic pole layer, which makes it possible to form the magnetic pole layer accurately even in narrow regions.

The reflection preventing film of the first thin film magnetic head according to the invention may be made of a magnetic material.

The thickness of the reflection preventing film of the first thin film magnetic head according to the invention is, for example, in the range from 20 to 200 $\mu$m.

The first thin film magnetic head according to the invention may further include an insulation layer provided between the first magnetic pole layer and the thin film coil and made of an inorganic insulating material for defining a throat height.

The first thin film magnetic head according to the invention may further include a magnetoresistive element for reading.

A second thin film magnetic head according to the invention comprises:
    first and second magnetic pole layers which are magnetically coupled to each other, which include magnetic pole portions being opposite to each other and being placed in regions of the magnetic pole layers on the side of surfaces thereof facing a recording medium and which are each constituted by at least one layer;
    a gap layer provided between the magnetic pole portion of the first magnetic pole layer and the magnetic pole portion of the second magnetic pole layer; and
    a thin film coil provided such that at least a part thereof is interposed between the first and second magnetic pole layers in a state of insulation from the first and second magnetic pole layers,
    the gap layer comprising a layer which is non-magnetic and conductive and which has a reflection preventing function for preventing the reflection of light for exposure at photolithography.

A method for manufacturing a second thin film magnetic head according to the invention is a method for manufacturing a thin film magnetic head comprising first and second magnetic pole layers which are magnetically coupled to each other, which include magnetic pole portions being opposite to each other and being placed in regions of the magnetic pole layers on the side of surfaces thereof facing a recording medium and which are each constituted by at least one layer, a gap layer provided between the magnetic pole portion of the first magnetic pole layer and the magnetic pole portion of the second magnetic pole layer and a thin film coil provided such that at least a part thereof is interposed between the first and second magnetic pole layers in a state of insulation from the first and second magnetic pole layers, the method including the steps of:
    forming the first magnetic pole layer;
    forming the gap layer comprising a layer which is non-magnetic and conductive and which has a reflection preventing function for preventing the reflection of light for exposure at photolithography on the first magnetic pole layer;

forming the thin film coil on the first magnetic pole layer in an insulated state; and forming the second magnetic pole layer on the thin film coil in an insulated state, the step of forming the second magnetic pole layer including the steps of:

forming a photoresist pattern for forming the second magnetic pole layer on the gap layer using photolithography; and forming the second magnetic pole layer using the photoresist pattern as a mask.

In the second thin film magnetic head or the method for manufacturing the same according to the invention, when the second magnetic pole layer is formed on the gap layer including a layer having a reflection preventing function, the gap layer prevents the reflection of light for exposure at photolithography.

In the second thin film magnetic head or the method for manufacturing the same according to the invention, the layer having a reflection preventing function may be made of a non-magnetic nitride such as titanium nitride.

In the second thin film magnetic head or the method for manufacturing the same according to the invention, the gap layer may include the layer having a reflection preventing function and a non-magnetic insulation layer. In this case, the insulation layer is made of, for example, alumina or aluminum nitride.

In the second thin film magnetic head or the method for manufacturing the same according to the invention, the thickness of the layer having a reflection preventing function is, for example, in the range from 20 to 200 $\mu$m.

The second thin film magnetic head or the method for manufacturing the same according to the invention may further include an insulation layer provided between the first magnetic pole layer and the thin film coil and made of an inorganic insulating material for defining a throat height.

The second thin film magnetic head or the method for manufacturing the same according to the invention may further include a magnetoresistive element for reading.

Other objects, features and advantages of the invention will become clear enough from the following description.

BRIEF DESCRIPTION OF THE DRAWINGS

FIGS. 1A and 1B are sectional views for illustrating a step in a method for manufacturing a thin film magnetic head according to a first embodiment of the invention.

FIGS. 2A and 2B are sectional views for illustrating a step following that shown in FIGS. 1A and 1B.

FIGS. 3A and 3B are sectional views for illustrating a step following that shown in FIGS. 2A and 2B.

FIGS. 4A and 4B are sectional views for illustrating a step following that shown in FIGS. 3A and 3B.

FIGS. 5A and 5B are sectional views for illustrating a step following that shown in FIGS. 4A and 4B.

FIGS. 6A and 6B are sectional views for illustrating a step following that shown in FIGS. 5A and 5B.

FIGS. 7A and 7B are sectional views for illustrating a step following that shown in FIGS. 6A and 6B.

FIGS. 8A and 8B are sectional views for illustrating a step following that shown in FIGS. 7A and 7B.

FIGS. 9A and 9B are sectional views for illustrating a step following that shown in FIGS. 8A and 8B.

FIGS. 10A and 10B are sectional views for illustrating a step following that shown in FIGS. 9A and 9B.

FIGS. 11A and 11B are sectional views for illustrating a step following that shown in FIGS. 10A and 10B.

FIGS. 12A and 12B are sectional views for illustrating a step following that shown in FIGS. 11A and 11B.

FIGS. 13A and 13B are sectional views of the thin film magnetic head according to the first embodiment of the invention.

FIGS. 19A and 19B are sectional views for illustrating a step following that shown in FIGS. 18A and 18B.

FIGS. 20A and 20B are sectional views for illustrating a step following that shown in FIGS. 19A and 19B.

FIGS. 21A and 21B are sectional views for illustrating a step following that shown in FIGS. 20A and 20B.

FIGS. 22A and 22B are sectional views for illustrating a step following that shown in FIGS. 21A and 21B.

FIGS. 23A and 23B are sectional views for illustrating a step following that shown in FIGS. 22A and 22B.

FIGS. 24A and 24B are sectional views for illustrating a step following that shown in FIGS. 23A and 23B.

DETAILED DESCRIPTION OF THE PREFERRED EMBODIMENTS

Figure 14:
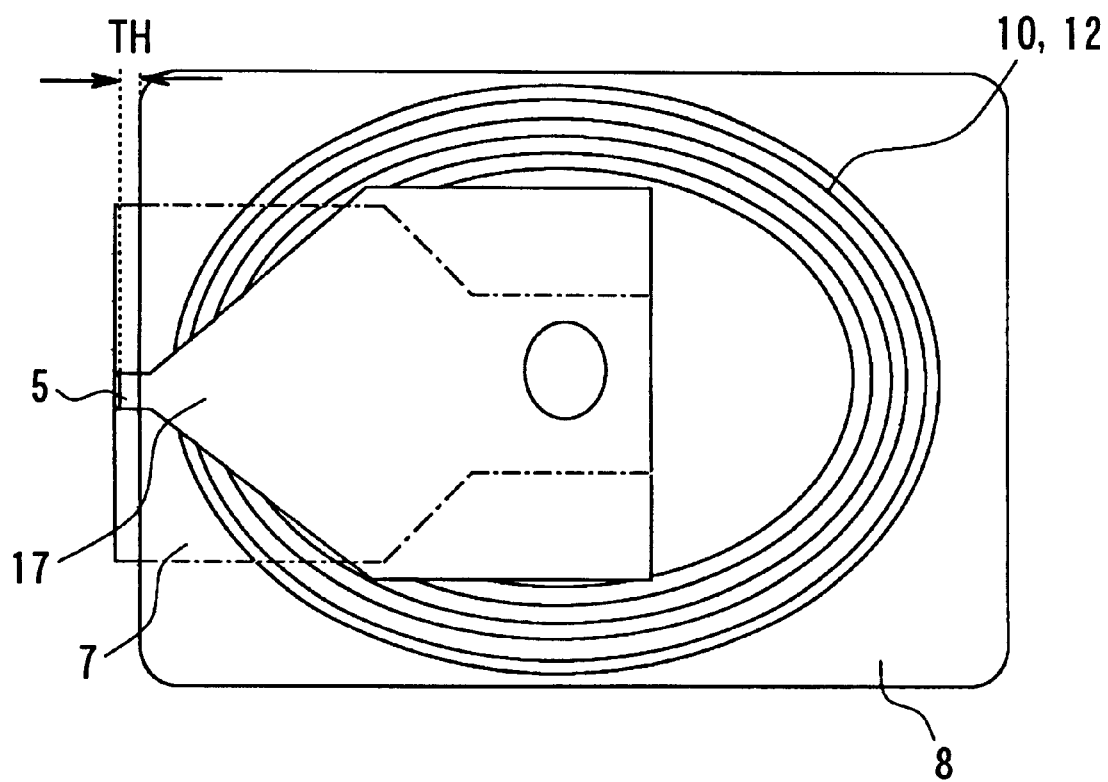
FIG. 14 is a plan view of the thin film magnetic head according to the first embodiment of the invention.

Preferred embodiments of the invention will now be described in detail with reference to the drawings.

[First Embodiment]

A description will be made first with reference to FIGS. 1A through 13A and FIGS. 1B through 13B on a composite thin film magnetic head according to a first embodiment of the invention and a method for manufacturing the same. FIGS. 1A through 13A show a section perpendicular to an air bearing surface of the thin film magnetic head, and FIGS. 1B through 13B show a section of a magnetic pole portion of the thin film magnetic head parallel to the air bearing surface.

According to the manufacturing method of the present embodiment, as shown in FIGS. 1A and 1B, an insulation layer 2 made of, for example, alumina ($Al_2O_3$) having a thickness in the range from about 3 to 5 μm is first deposited on a substrate 1 made of, for example, aluminum oxide and titanium carbide ($Al_2O_3$.TiC). Next, as shown in FIGS. 2A and 2B, a plating process is performed using a photoresist film as a mask to form permalloy (NiFe) selectively on the insulation layer 2 to a thickness of about 3 μm, thereby forming a bottom shield layer 3 for a reproduction head.

Next, as shown in FIGS. 3A and 3B, sputtering is performed to deposit, for example, alumina with a thickness in the range from 100 to 200 nm on the bottom shield layer 3, thereby forming a shield gap film 4. Then, an MR film 5 to serve as an MR element for reproduction is formed on the shield gap film 4 to a thickness of 10 nm or less and is patterned into a desired configuration using photolithography with high accuracy. Next, a shield gap film 6 is formed on the shield gap film 4 and MR film 5 to embed the MR film 5 between the shield gap films 4 and 6.

Next, as shown in FIGS. 4A and 4B, a top shield layer-cum-bottom magnetic pole layer (hereinafter referred to as "bottom magnetic pole layer") 7 made of, for example, permalloy is selectively formed on the shield gap film 6 to a thickness in the range from about 3 to 4 μm. The bottom magnetic pole layer 7 corresponds to the first magnetic pole layer of the invention.

Next, a film made of an inorganic insulating material, e.g., a silicon dioxide film ($SiO_2$), is formed on the bottom magnetic pole layer 7 to a thickness in the range from about 1 to 2 μm, and taper etching is thereafter carried out to pattern it selectively. Thus, an insulation layer 8 to define an apex angle and a throat height is formed. The insulation film 8 is not limited to a silicon dioxide film and, alternatively, a film made of a different inorganic insulating material such as an alumina film or silicon nitride (SiN) film may be used. The above-described film may be formed using a sputtering or CVD (chemical vapor deposition) process. Next, a recording gap layer 9 constituted by an insulation film, e.g., an alumina film, is formed on the bottom magnetic pole layer 7 and insulation layer 8.

As shown in FIGS. 5A and 5B, a first layer thin film coil 10 for an induction type recording head made of, for example, copper is then formed on the recording gap layer 9 to a thickness in the range from 2 to 3 μm using, for example, an electrolytic plating process.

Next, as shown in FIGS. 6A and 6B, a photoresist layer 11 is formed in a predetermined pattern on the recording gap layer 9 and coil 10 using photolithography with high accuracy. Next, a heating process at a temperature of, for example, 250° C. is carried out to planarize the photoresist layer 11 and to provide insulation at the gaps of the coil 10.

For example, an electrolytic plating process is then performed to form a second layer thin film coil 12 made of, for example, copper on the photoresist layer 11 to a thickness in the range from 2 to 3 μm. Next, a photoresist layer 13 is formed in a predetermined pattern on the photoresist layer 11 and coil 12 using photolithography with high accuracy, and a heating process at a temperature of, for example, 250° C. is carried out to planarize the photoresist layer 13 and to provide insulation at the gaps of the coil 12.

Next, as shown in FIGS. 7A and 7B, the recording gap layer 9 is partially etched for forming a magnetic path in a position behind (right-hand side in FIG. 7A) the coils 10 and 12. Then, before forming a top magnetic pole layer, a NiFe-based alloy which is a material having a high saturation flux density is formed to a thickness of about 70 nm using, for example, sputtering to form an electrode film 14 which serves as a seed layer in an electrolytic plating process.

Next, for example, sputtering is performed to form a reflection preventing film 15 made of a non-magnetic material, having conductivity and having a function of preventing the reflection of light for exposure at photolithography on the electrode film 14 to a thickness in the range from 20 to 200 nm. For example, the reflection preventing film 15 may be a titanium nitride (TiN) film. The color of the surface of a titanium nitride film changes from light yellow to dark yellow depending on the thickness thereof, which indicates that the film has a reflection preventing function. The reflection preventing film 15 of the present embodiment is not limited to a titanium nitride film, and any material may be used as long as it is non-magnetic and conductive and it has a reflection preventing function. Such films include films made of several types of non-magnetic metal nitrides such as tantalum nitride (TaN). For example, i-line (having a wavelength of 365 nm) is used as light for exposure at photolithography. This is not limiting the invention, and it is possible to use g-line (having a wavelength of 436 nm), wide band light excluding i-line, wide band light, ultraviolet ray, laser light from an excimer laser and the like, X-ray, electron beam and the like.

Next, as shown in FIGS. 8A and 8B, photoresist is applied on the reflection preventing film 15 and is patterned using photolithography to form a photoresist pattern 16 which serves as a frame (outer frame) for forming the top magnetic pole layer using a frame plating process.

Next, as shown in FIGS. 9A and 9B, dry etching, e.g., reactive ion etching (RIE), is performed using the photoresist pattern 16 as a mask to etch the reflection preventing film 15 selectively, thereby removing the reflection preventing film 15 in the region where a top magnetic pole layer is to be formed. For example, a chlorine-based gas is used as the reactive gas used for the reactive ion etching. Another way of dry etching such as ion milling may be used instead of reactive ion etching.

Next, as shown in FIGS. 10A and 10B, an electrolytic plating process is performed using the photoresist pattern 16 as a mask and the previously formed electrode film 14 as a seed layer to form a top magnetic pole layer 17 to a thickness in the range from about 3 to 5 μm. The top magnetic pole layer 17 corresponds to the second magnetic pole layer of the invention. The top magnetic pole layer 17 is in contact with and magnetically coupled to the bottom magnetic pole layer 7 in a position behind the coils 10 and 12. Then, as shown in FIGS. 11A and 11B, the photoresist pattern 16 is removed.

As shown in FIGS. 12A and 12B, for example, ion milling is then performed using the top magnetic pole layer 17 as a mask to etch the recording gap layer 9 and bottom magnetic pole layer 7 by about 0.5 μm, thereby forming a trim structure. This also removes the reflection preventing film 15 and electrode film 14 which have existed under the photoresist pattern 16.

Next, as shown in FIGS. 13A and 13B, an overcoat layer 18 made of, for example, alumina is formed on the top magnetic pole layer 17. Finally, mechanical processing of a slider is performed to form an air bearing surface of the recording and reproduction heads, thereby completing the thin film magnetic head of the present embodiment.

FIG. 14 is a plan view of the thin film magnetic head of the present embodiment. The overcoat layer 18 is omitted in FIG. 14. FIG. 14 also shows a state before mechanical processing of a slider. In FIG. 14, TH represents the throat height, and the throat height TH is defined by the edge of the insulation layer 8 at the side of the magnetic pole portion.

As described above, the thin film magnetic head of the present embodiment has a reproduction head and a recording head (induction type magnetic transducer). The reproduction head has the MR element 5 and the bottom shield layer 3 and top shield layer (bottom magnetic pole layer) 7 for shielding the MR element 5, provided such that they are opposite to each other with the MR element 5 interposed therebetween in regions thereof facing the recording medium.

The recording head includes the bottom magnetic pole layer 7 and the top magnetic pole layer 17 which are magnetically coupled to each other, which include magnetic pole portions being opposite to each other with the recording gap layer 9 interposed therebetween and being placed in regions of the magnetic pole layers on the side of surfaces thereof facing a recording medium and which are each constituted by at least one layer and the thin film coils 10 and 12 disposed such that at least a part thereof is interposed between the two magnetic pole layers 7 and 17 in a state of insulation from the magnetic pole layers 7 and 17.

In the present embodiment, before forming the photoresist pattern 16 to serve as a frame (outer frame) for forming the top magnetic pole layer 17 using an electrolytic plating process, the reflection preventing film 15 is formed on the electrode film 14 to serve as a seed layer, and the photoresist pattern 16 is formed on the reflection preventing film 15. Therefore, the present embodiment prevents the adverse effects of the light for exposure at photolithography reflected by the electrode film 14 including the breakage of the photoresist pattern. This makes it possible to form the top magnetic pole layer 17 accurately in a desired configuration because, for example, the side walls of the top magnetic pole layer 17 can be vertically formed without being rounded. According to the present embodiment, it is thus possible to control the width of the magnetic pole accurately and to thereby form the top magnetic pole layer 17 for providing a narrow track structure with high accuracy. Further, according to the present embodiment, a trim structure in a desired configuration can be accurately formed by etching the recording gap layer 9 and bottom magnetic pole layer 7 using the accurately formed top magnetic pole layer 17 as a mask. It is therefore possible to prevent any increase in the effective track width attributable to expansion of magnetic flux that occurs during writing of the narrow track.

The reflection preventing film 15 is effective in preventing adverse effects of reflection of light for exposure in that it reduces the reflection factor by some percent from the value in the absence of the same. When a titanium nitride film is used as the reflection preventing film 15, a reflection reducing factor in the range from about 10 to 70 percent can be achieved, although it depends on the thickness of the film. Especially, a titanium nitride film having a thickness in the range from about 50 to 100 nm provides a great reflection reducing factor because it is dark yellow on the surface thereof with such a thickness.

When a titanium nitride film is used as the reflection preventing film 15, the reflection preventing film 15 can be accurately removed in the region where the top magnetic pole layer 17 is to be formed by means of etching using the photoresist pattern 16 as a mask or selective etching. It is therefore possible to form the top magnetic pole layer 17 accurately with a width on a submicron order using the electrode film 14 as a seed layer.

According to the present embodiment, since the reflection preventing film 15 is conductive, the conductive reflection preventing film 15 is still left at the gap between the photoresist pattern 16 and electrode film 14 as shown in FIG. 10B when the top magnetic pole layer 17 is formed using a frame plating process. Thus, the reflection preventing film 15 functions as a part of the electrode for plating. Thus, it can be anticipated a sufficient current flows in narrow regions such as regions in the vicinity of the boundaries between the side walls of the photoresist pattern 16 and the electrode film 14. It is therefore possible to form the top magnetic pole layer 17 accurately and to make the composition of the same uniform. As a result, the top magnetic pole layer 17 can be formed with a desired magnetic domain structure which is important for a magnetic head.

When a titanium nitride film is used as the reflection preventing film 15, the photoresist is cut sharply. This makes it possible to prevent scum of the photoresist pattern 16 (residual resist) and, especially, the magnetic pole width can be controlled accurately to allow the top magnetic pole layer 17 for providing a narrow track structure to be formed accurately.

According to the present embodiment, since the insulation layer 8 defining the throat height is constituted by a film made of an inorganic insulating material, the heating process at a temperature of about 250° C. for forming the coils 10 and 12 will not result in positional fluctuation of the edges of the insulation layer (pattern shift) and deterioration of the profile of the same. This makes it possible to control the throat height accurately. Further, the MR height and apex angle can be accurately controlled.

According to the present embodiment, since the insulation layer 8 defining the throat height is constituted by a film made of an inorganic insulating material, the position of the insulation layer 8 does not fluctuate during the etching of the seed layer to form the coils 10 and 12 using a plating process and during the etching of the recording gap layer 9 and bottom magnetic pole layer 7 to form a trim structure. This also makes it possible to control the throat height accurately.

As described above, the present embodiment makes it possible to manufacture a high performance thin film magnetic head having a narrow track structure in which the magnetic pole width, MR height and apex angle can be accurately controlled and in which it is possible to prevent any increase in the effective track width attributable to expansion of magnetic flux that occurs during writing of the narrow track.

According to the present embodiment, the thick insulation layer 8 can be formed between the bottom magnetic pole layer (top shield layer) 7 and the coils 10 and 12 in addition to the thin recording gap layer 9. This makes it possible to achieve a high insulation withstand voltage between the bottom magnetic pole layer (top shield layer) 7 and the coils 10 and 12 and to reduce leakage of magnetic flux from the coils 10 and 12.

In the present embodiment, for example, a NiFe (80% Ni and 20% Fe by weight) is used for the top magnetic pole layer 17. This is not limiting the invention, and it is possible to use a material having a high saturation flux density such as NiFe (50% Ni and 50% Fe by weight), iron nitride (FeN), amorphous Fe—Co—Zr or the like or to use layers formed by two of such materials. A magnetic material obtained by stacking NiFe and a material having a high saturation density as described above may be used as the bottom magnetic pole layer.

[Second Embodiment]

Figures 15A, 15B:
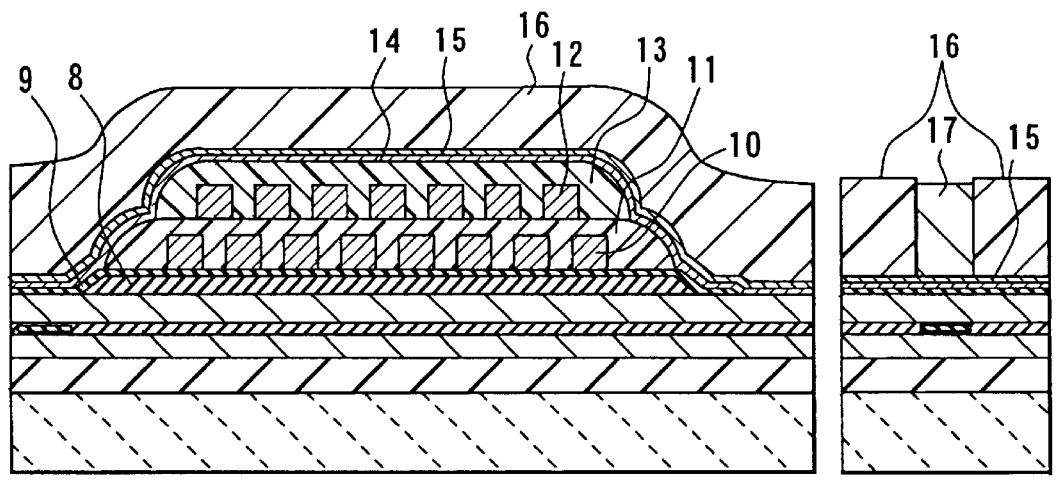
FIGS. 15A and 15B are sectional views for illustrating a step in a method for manufacturing a thin film magnetic head according to a second embodiment of the invention.
Figures 16A, 16B:
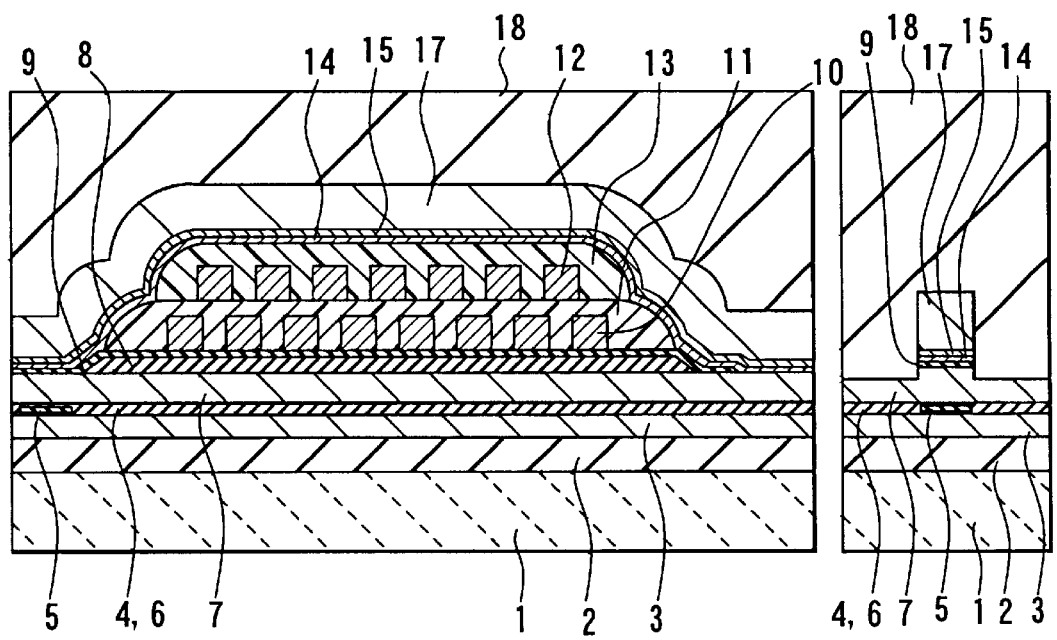
FIGS. 16A and 16B are sectional views of the thin film magnetic head according to the second embodiment of the invention.

A description will be made with reference to FIGS. 15A, 15B, 16A and 16B on a method for manufacturing a composite thin film magnetic head according to a second embodiment of the invention. FIGS. 15A and 16A show a section perpendicular to an air bearing surface of the thin film magnetic head, and FIGS. 15B and 16B show a section of a magnetic pole portion of the thin film magnetic head parallel to the air bearing surface.

According to the present embodiment, a reflection preventing film 15 is made of a magnetic material, is conductive and which has a reflection preventing function for preventing the reflection of light for exposure at photolithography. For example, materials for forming such a reflection preventing film 15 include FeN and FeMeN (Me=Zr, Ta, Nb, Ti, Hf, B, Si, Al or the like).

Steps of a method for manufacturing the thin film magnetic head according to the present embodiment are as described with reference to FIGS. 1A through 8A and FIGS. 1B through 8B like the first embodiment.

According to the present embodiment, as shown in FIGS. 15A and 15B, after a photoresist pattern 16 is formed, a top magnetic pole layer 17 is formed without removing the reflection preventing layer 15 by means of an electrolytic plating process using the photoresist pattern 16 as a mask and an electrode film 14 and reflection preventing film 15 as a seed layer.

Subsequent step of the present embodiment are as described with reference to FIGS. 11A through 13A and FIGS. 11B through 13B like the first embodiment. In the present embodiment, however, the state after the formation of an overcoat layer 18 is as shown in FIGS. 16A and 16B because the reflection preventing film 15 is left on the electrode film 14 in the region of the magnetic pole.

According to the present embodiment, the reflection preventing film 15 is conductive and has a reflection preventing function for preventing the reflection of light for exposure at photolithography and, in addition, the film 15 is magnetic. Therefore, the top magnetic pole layer 17 can be formed by means of an electrolytic plating process using the reflection preventing film 15 as an electrode (seed layer) instead of removing the reflection preventing film 15. Further, the residue of the reflection preventing film 15 can be used as a part of the top magnetic pole layer. Therefore, the present embodiment allows a reduction in the number of steps from that of the first embodiment because the step of removing the reflection preventing film 15 is deleted.

Further, according to the present embodiment, it is possible to prevent the reflection preventing film from remaining between the photoresist patterns because the reflection preventing film 15 is not removed. As a result, the top magnetic pole layer 17 can be accurately formed even in narrow regions.

The configuration, operation and effects of the present embodiment are otherwise the same as those of the first embodiment except the effects unique to the first embodiment.

According to the invention, a reflection preventing film made of a magnetic material as mentioned in the second embodiment may be provided instead of a reflection preventing film made on a non-magnetic material as in the first embodiment, and the reflection preventing film made of a magnetic material may be removed using the photoresist pattern 16 as a mask before forming the top magnetic pole layer 17.

According to the first or second embodiment, a reflection preventing film which is conductive and which has a function of preventing the reflection of light for exposure at photolithography is formed on an electrode film used for forming one of the magnetic pole layers or the second magnetic pole layer; a photoresist pattern is formed on the reflection preventing film using photolithography; and one of the magnetic pole layers or the second magnetic pole layer is formed using the photoresist pattern as a mask. Therefore, these embodiments make it possible to prevent adverse effects of the reflection of light for exposure at photolithography such as the breakage of the photoresist pattern, thereby allowing accurate control of the magnetic pole width.

Since the reflection preventing film in each of the above-described embodiments is conductive, the reflection preventing film functions at least as a part of the electrode film for forming one of the magnetic pole layers or the second magnetic pole layer, which makes it possible to form the magnetic pole layer accurately even in narrow regions.

When the reflection preventing film is removed using the photoresist pattern as a mask before one of the magnetic pole layers or the second magnetic layer is formed, since the reflection preventing film residing under the photoresist pattern functions as a part of the electrode film for forming one of the magnetic pole layers or the second magnetic pole layer, the magnetic pole layer can be formed accurately even in narrow regions such as regions in the vicinity of boundaries between the side walls of the photoresist pattern and the electrode film.

When the reflection preventing film is made of titanium nitride, since the photoresist is sharply cut, it is possible to prevent scum of the photoresist pattern and to thereby form the magnetic pole layer with high accuracy.

When one of the magnetic pole layers or the second magnetic pole layer is formed on the reflection preventing film, the reflection preventing film functions as an electrode for forming one of the magnetic pole layers or the second magnetic pole layer. This eliminates the need for the step of removing the reflection preventing film and makes it possible to form the magnetic pole layer accurately even in narrow regions.

When the reflection preventing film is made of a magnetic material, the reflection preventing film may be used as a part of the magnetic pole layer instead of removing it.

When the insulation layer defining the throat height is constituted by a film made of an inorganic insulating material, it is further possible to prevent positional fluctuation of the insulation layer, thereby allowing accurate control of the throat height.

[Third Embodiment]

A description will be made first with reference to FIGS. 17A through 25A and FIGS. 17B through 25B on a composite thin film magnetic head according to a third embodiment of the invention and a method for manufacturing the same. FIGS. 17A through 25A show a section perpendicular to an air bearing surface of the thin film magnetic head, and FIGS. 17B through 25B show a section of a magnetic pole portion of the thin film magnetic head parallel to the air bearing surface.

Figures 17A, 17B:
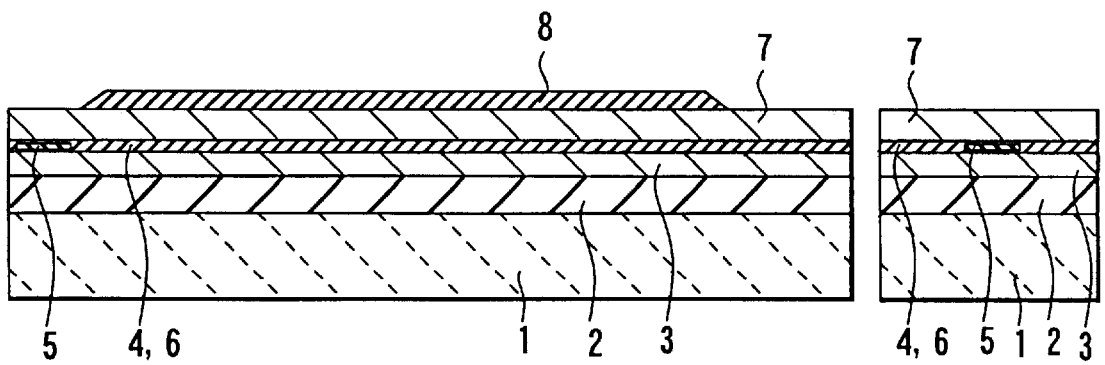
FIGS. 17A and 17B are sectional views for illustrating a step in a method for manufacturing a thin film magnetic head according to a third embodiment of the invention.

The method for manufacturing a thin film magnetic head of the present embodiment is the same as that of the first embodiment up to the step of forming an insulation layer 8 on a bottom magnetic pole layer 7. FIGS. 17A and 17B show the state in which the insulation layer 8 has been formed on the bottom magnetic pole layer 7.

Figures 18A, 18B:
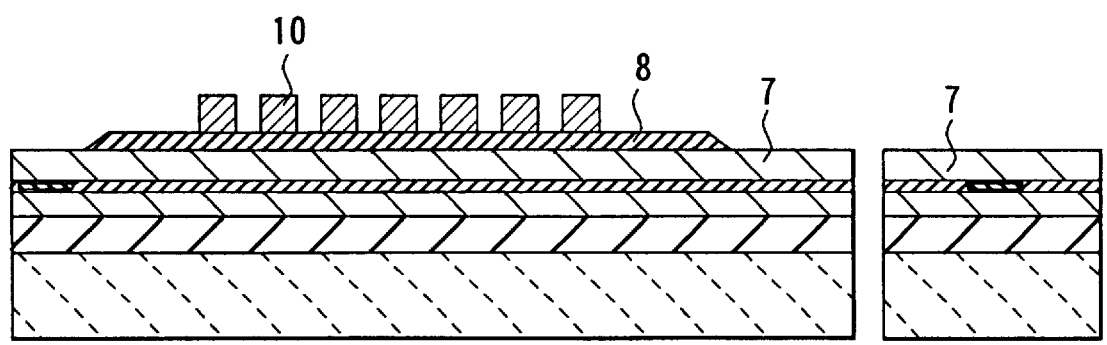
FIGS. 18A and 18B are sectional views for illustrating a step following that shown in FIGS. 17A and 17B.

According to the method for manufacturing a thin film magnetic head of the present embodiment, as shown in FIGS. 18A and 18B, a first layer thin film coil 10 for an induction type recording head made of, for example, copper is formed on the insulation layer 8 to a thickness in the range from 2 to 3 μm using, for example, an electrolytic plating process.

Next, as shown in FIGS. 19A and 19B, a photoresist layer 11 is formed in a predetermined pattern on the insulation layer 8 and coil 10 using photolithography with high accuracy. Next, a heating process at a temperature of, for example, 250° C. is carried out to planarize the photoresist layer 11 and to provide insulation at the gaps of the coil 10.

For example, an electrolytic plating process is then performed to form a second layer thin film coil 12 made of, for example, copper on the photoresist layer 11 to a thickness in the range from 2 to 3 μm. Next, a photoresist layer 13 is formed in a predetermined pattern on the photoresist layer 11 and coil 12 using photolithography with high accuracy, and a heating process at a temperature of, for example, 250° C. is carried out to planarize the photoresist layer 13 and to provide insulation at the gaps of the coil 12.

Next, as shown in FIGS. 20A and 20B, a recording gap layer 25 made of non-magnetic material, having conductivity and having a reflection preventing function for preventing the reflection of light for exposure at photolithography is formed to a thickness in the range from 20 to 200 nm using, for example, sputtering. For example, a titanium nitride (TiN) film is such a film made of non-magnetic material, having conductivity and having a reflection preventing function. The color of the surface of a titanium nitride film changes from light yellow to dark yellow depending on the thickness thereof, which indicates that the film has a reflection preventing function. The recording gap layer 25 of the present embodiment is not limited to a titanium nitride film, and any material may be used as long as it is non-magnetic and conductive and it has a reflection preventing function. Such films include films made of several types of non-magnetic metal nitrides such as tantalum nitride (TaN). For example, i-line (having a wavelength of 365 nm) is used as light for exposure at photolithography. This is not limiting the invention, and it is possible to use g-line (having a wavelength of 436 nm), wide band light excluding i-line, wide band light, ultraviolet ray, laser light from an excimer laser and the like, X-ray, electron beam and the like.

The recording gap layer 25 may be formed by one layer such as a titanium nitride film. Alternatively, it may be formed by two or more layers made of a non-magnetic material such as a combination of an insulation film made of a non-magnetic material such as an alumina film or aluminum nitride (AlN) film and a titanium nitride film. In this case, however, at least the uppermost layer must have conductivity and a reflection preventing function for preventing the reflection of light for exposure at photolithography. The insulation layer made of a non-magnetic material for forming the recording gap layer 25 corresponds to the insulation layer for the gap according to the invention.

Next, as shown in FIGS. 21A and 21B, the recording gap layer 25 is partially etched to form a magnetic path in a position behind (right-hand side in FIG. 21A) the coils 10 and 12. Photoresist is applied on the recording gap layer 25 and is patterned using photolithography to form a photoresist pattern 16 which serves as a frame (outer frame) for forming the top magnetic pole layer using a frame plating process.

Next, as shown in FIGS. 22A and 22B, an electrolytic plating process is performed using the photoresist pattern 16 as a mask and the conductive recording gap layer 25 as a seed layer to form a top magnetic pole layer 17 to a thickness in the range from about 3 to 5 μm. The bottom magnetic pole layer 7 serves as a seed layer in the position behind the coils 10 and 12 where the recording gap layer 25 is etched and removed. The top magnetic pole layer 17 corresponds to the second magnetic pole layer according to the invention. The top magnetic pole layer 17 is in contact with and magnetically coupled to the bottom magnetic pole layer 7 in a position behind the coils 10 and 12. Then, as shown in FIGS. 23A and 23B, the photoresist pattern 16 is removed.

As shown in FIGS. 24A and 24B, for example, ion milling is then performed using the top magnetic pole layer 17 as a mask to etch the recording gap layer 25 and bottom magnetic pole layer 7 by about 0.5 μm, thereby forming a trim structure.

Figures 25A, 25B:
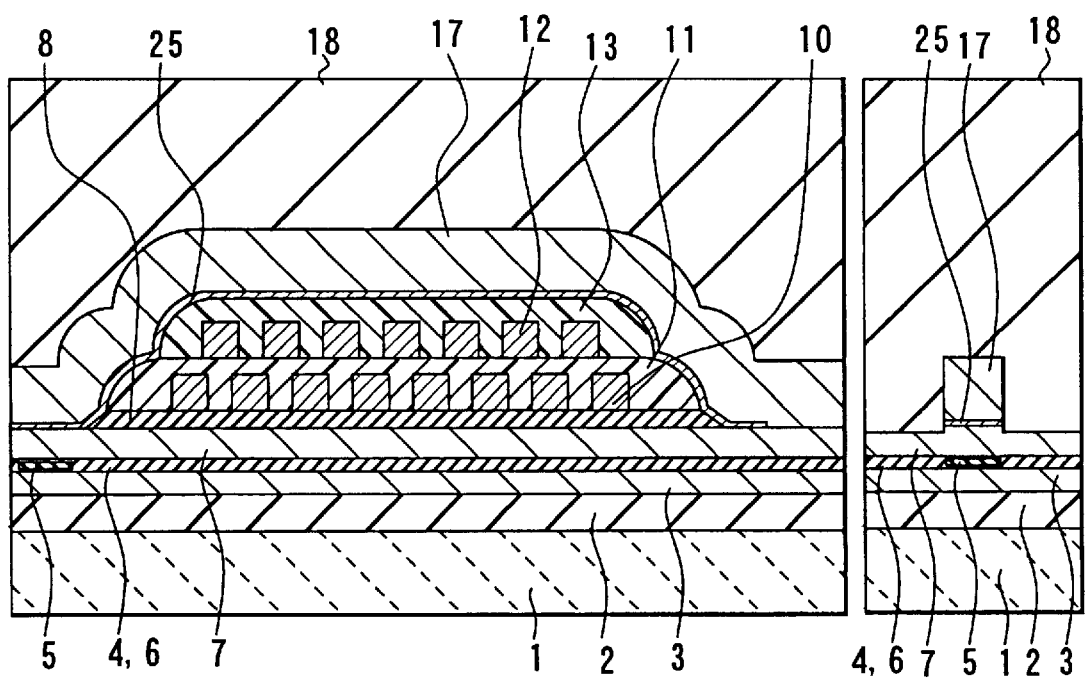
FIGS. 25A and 25B are sectional views of the thin film magnetic head according to the third embodiment of the invention.
Figure 26:
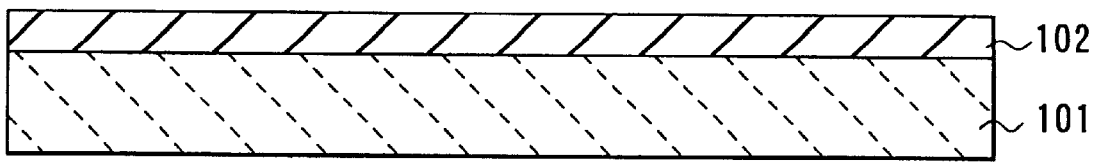
FIG. 26 is a sectional view for illustrating a step in a method for manufacturing a thin film magnetic head according to the related art.
Figure 27:
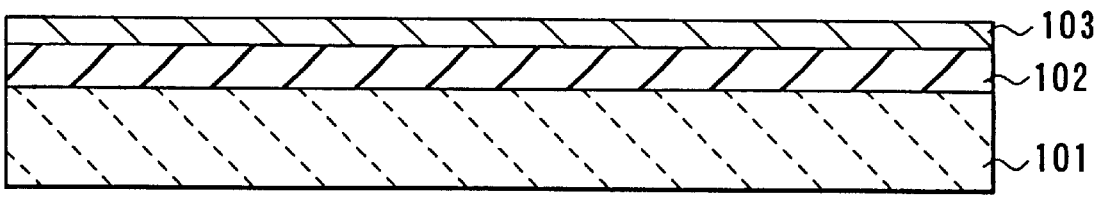
FIG. 27 is a sectional view for illustrating a step following that shown in FIG. 26.
Figure 28:
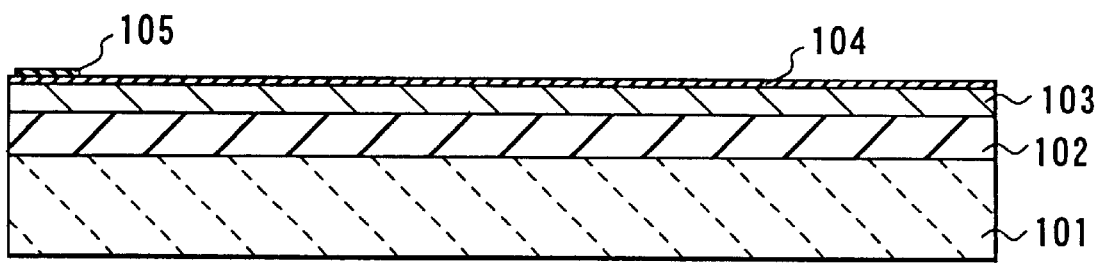
FIG. 28 is a sectional view for illustrating a step following that shown in FIG. 27.
Figure 29:
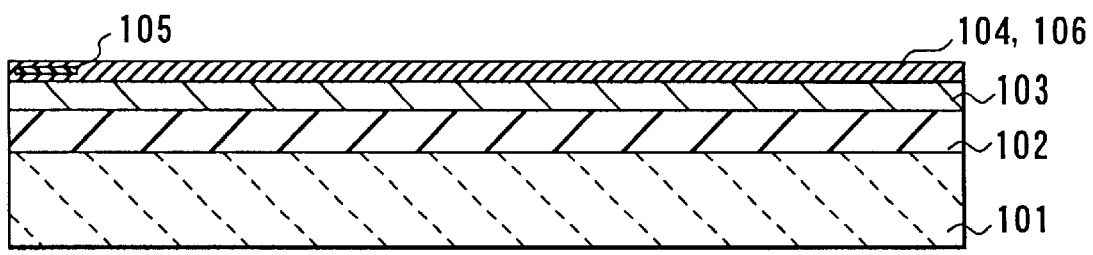
FIG. 29 is a sectional view for illustrating a step following that shown in FIG. 28.
Figure 30:
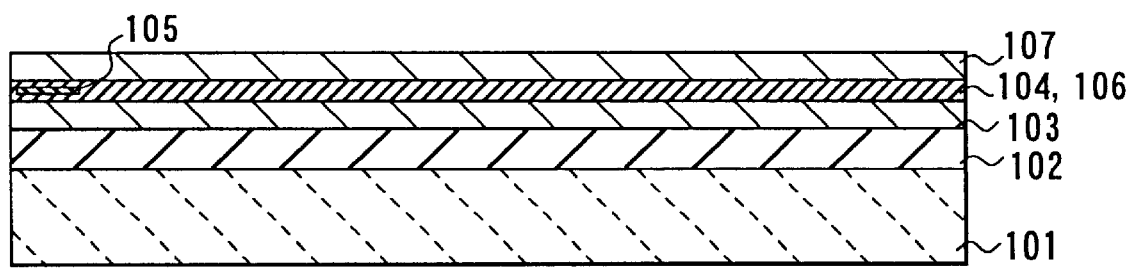
FIG. 30 is a sectional view for illustrating a step following that shown in FIG. 29.
Figure 31:
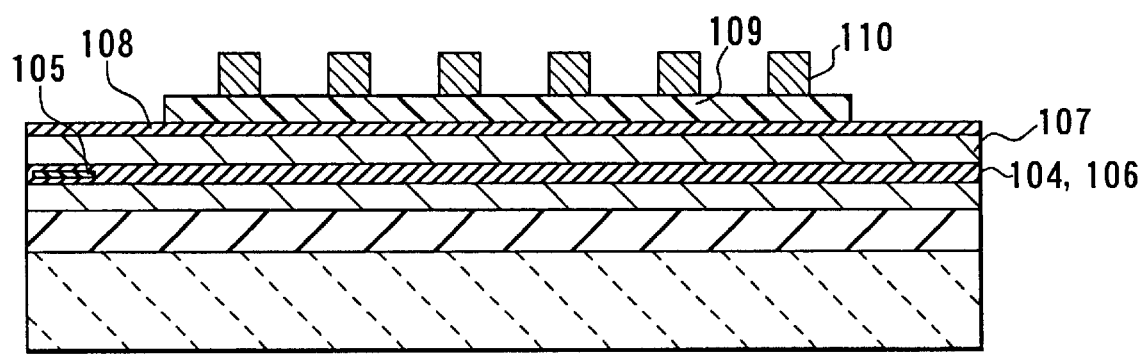
FIG. 31 is a sectional view for illustrating a step following that shown in FIG. 30.
Figure 32:
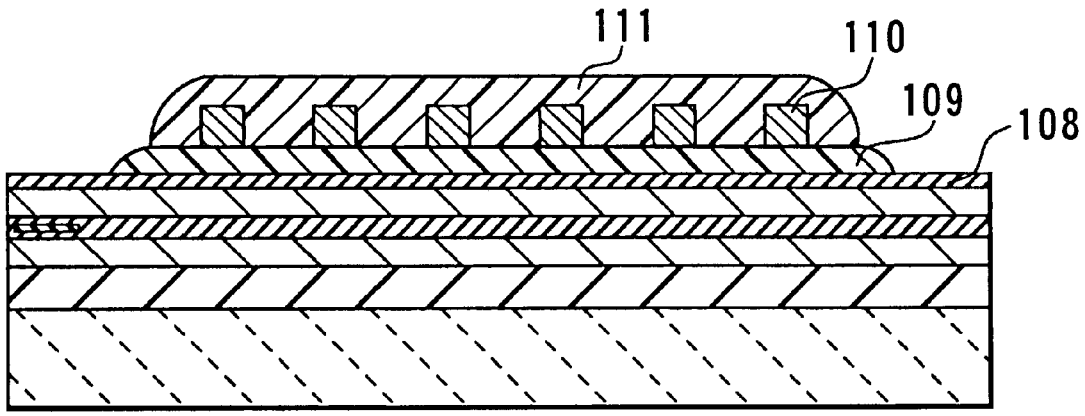
FIG. 32 is a sectional view for illustrating a step following that shown in FIG. 31.
Figure 33:
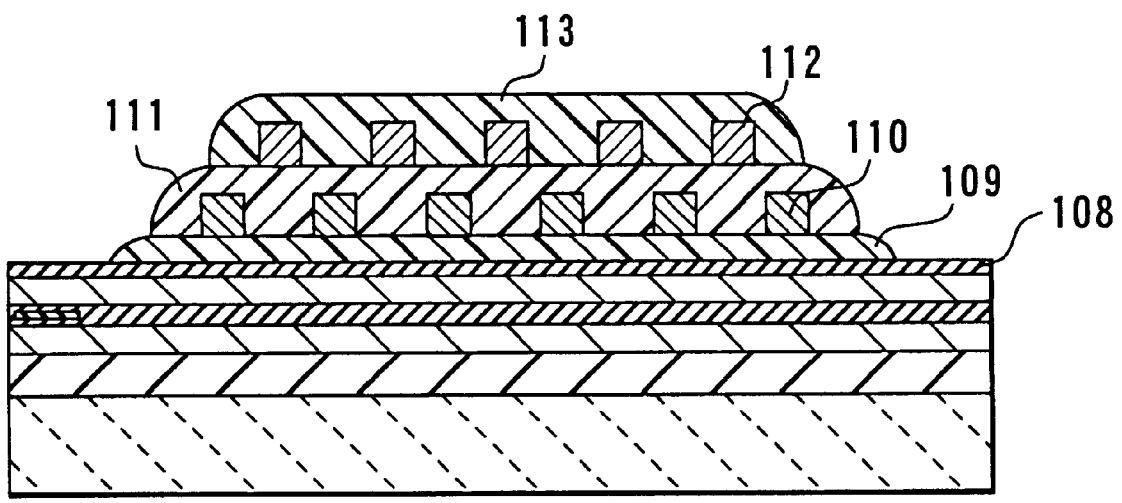
FIG. 33 is a sectional view for illustrating a step following that shown in FIG. 32.
Figure 34:
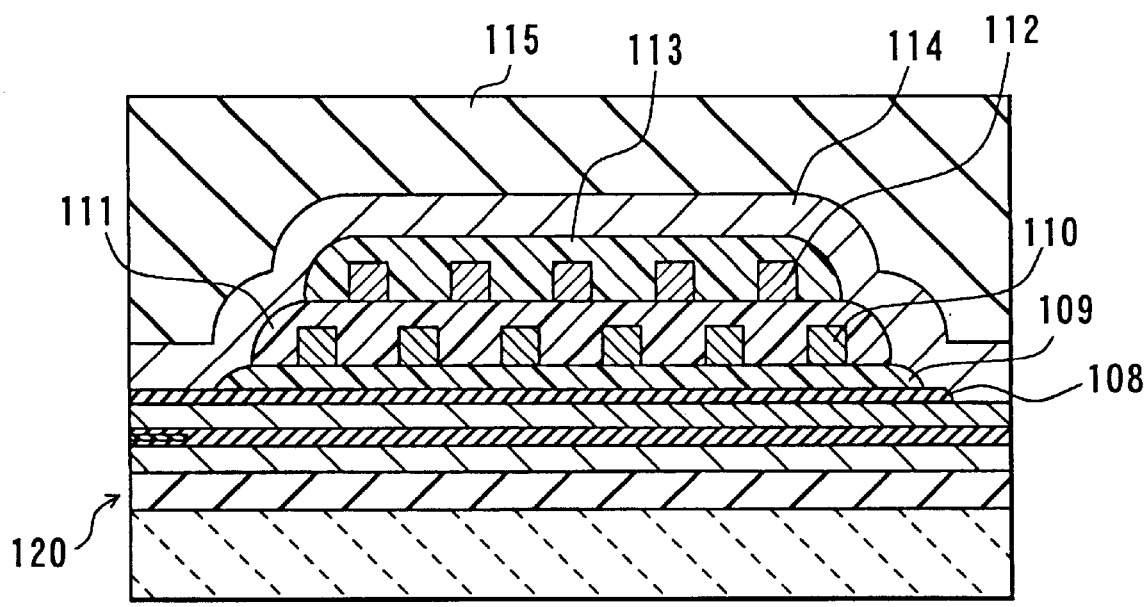
FIG. 34 is a sectional view for illustrating a step following that shown in FIG. 33.
Figure 35:
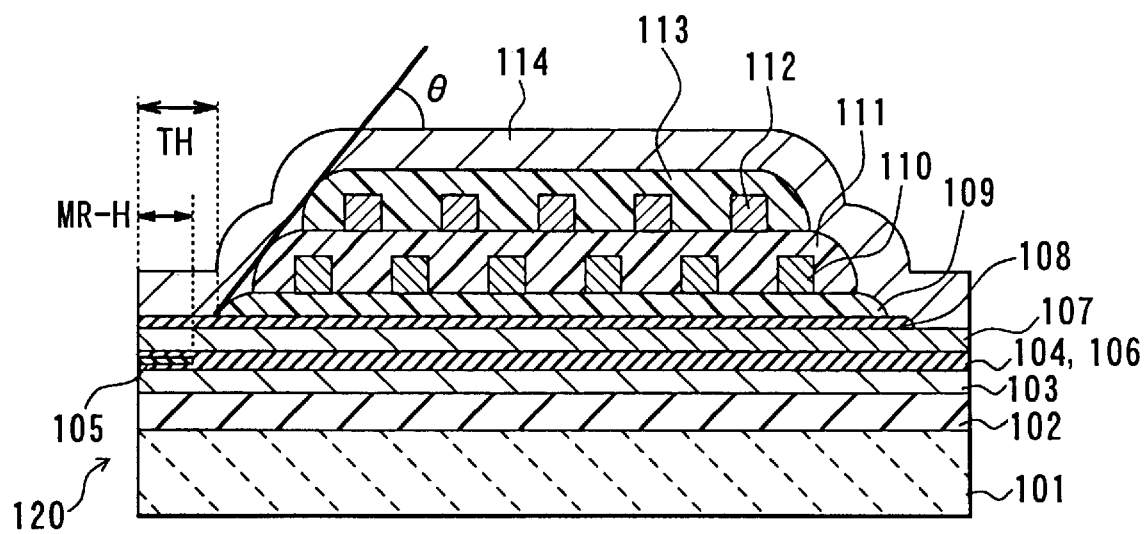
FIG. 35 is a sectional view showing a section perpendicular to an air bearing surface of a thin film magnetic head according to the related art.
Figure 36:
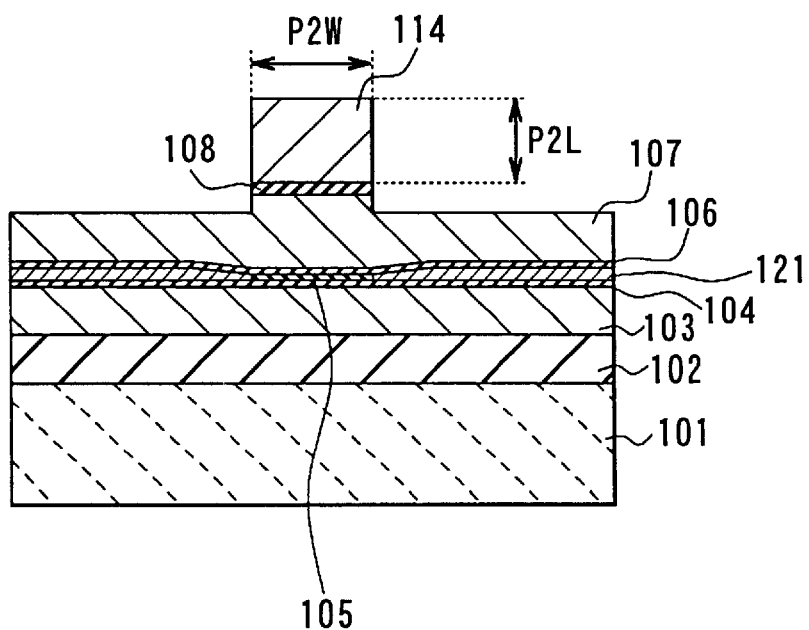
FIG. 36 is a sectional view showing a section of a magnetic pole portion of the thin film magnetic head according to the related art parallel to the air bearing surface.

Next, as shown in FIGS. 25A and 25B, an overcoat layer 18 made of, for example, alumina is formed on the top magnetic pole layer 17. Finally, mechanical processing of a slider is performed to form an air bearing surface of the recording and reproduction heads, which completes a thin film magnetic head.

As described above, according to the present embodiment, the recording gap layer 25 is non-magnetic and has conductivity and a reflection preventing function, and the photoresist pattern 16 to serve as a frame (outer frame) for forming the top magnetic pole layer 17 using an electrolytic plating process is formed on the recording gap layer 25. Therefore, the present embodiment prevents adverse effects of the light for exposure at photolithography reflected by the electrode film including the breakage of the photoresist pattern. This makes it possible to form the top magnetic pole layer 17 accurately in a desired configuration because, for example, the side walls of the top magnetic pole layer 17 can be vertically formed without being rounded. According to the present embodiment, it is thus possible to control the width of the magnetic pole accurately and to thereby form the top magnetic pole layer 17 for providing a narrow track structure with high accuracy. Further, according to the present embodiment, a trim structure in a desired configuration can be accurately formed by etching the recording gap layer 25 and bottom magnetic pole layer 7 using the accurately formed top magnetic pole layer 17 as a mask. It is therefore possible to prevent any increase in the effective track width attributable to expansion of magnetic flux that occurs during writing of the narrow track.

The reflection preventing function of the recording gap layer 25 is effective in preventing adverse effects of reflection of light for exposure in that it reduces the reflection factor by some percent from the value in the absence of the same. When a titanium nitride film is used as the recording gap layer 25, a reflection reducing factor in the range from about 10 to 70 percent can be achieved, although it depends on the thickness of the film. Especially, a titanium nitride film having a thickness in the range from about 50 to 100 nm provides a great reflection reducing factor because it is dark yellow on the surface thereof with such a thickness.

When a titanium nitride film is used as the recording gap layer 25, the photoresist is cut sharply. This makes it possible to prevent scum of the photoresist pattern 16 (residual resist) and, especially, the magnetic pole width can be controlled accurately to allow the top magnetic pole layer 17 for providing a narrow track structure to be formed accurately.

Further, since the recording gap layer 25 also serves as a reflection preventing film according to the present embodiment, it is possible to reduce the number of steps from that in a case wherein a reflection preventing film is formed separately from a recording gap layer as disclosed in Japanese Patent Laid-Open Publication No. 9-180127 because the need for the steps of forming and removing the reflection preventing film is eliminated.

According to the present embodiment, since there is no need for removing the reflection preventing film, it is possible to prevent the reflection preventing film from remaining between the photoresist patterns. This makes it possible to form the top magnetic pole layer 17 accurately even in narrow regions.

According to the present embodiment, titanium nitride can be used for the recording gap layer 25. Since the recording gap layer 25 made of titanium nitride has better film quality and less pin holes compared to a recording gap layer made of alumina according to the related art, it serves as a high quality recording gap layer which makes it possible to improve the reliability of a thin film magnetic head. Further, since the thickness of the recording gap layer 25 can be small for the same reason, the characteristics of the recording head can be improved.

According to the present embodiment, it is therefore possible to manufacture a thin film magnetic head having a high performance narrow track structure in which the magnetic pole width, throat height, MR height and apex angle are accurately controlled and in which it is possible to prevent any increase in the effective track width attributable to expansion of magnetic flux that occurs during writing of the narrow track.

According to the present embodiment, the thick insulation layer 8 can be formed between the bottom magnetic pole layer (top shield layer) 7 and the coils 10 and 12. This makes it possible to achieve a high insulation withstand voltage between the bottom magnetic pole layer (top shield layer) 7 and the coils 10 and 12 and to reduce leakage of magnetic flux from the coils 10 and 12.

As described above, according to the present embodiment, the gap layer is constituted by one or more layers including a layer which is non-magnetic and conductive and which has a reflection preventing function for preventing the reflection of light for exposure at photolithography. This makes it possible to prevent adverse effects of the reflection of light for exposure at photolithography such as the breakage of the photoresist pattern during the formation of a magnetic pole layer on the gap layer, thereby allowing accurate control of the width of the magnetic pole. Furthermore, since the gap layer according to the present embodiment has a reflection preventing function, there is no need for the steps of forming and removing a reflection preventing film unlike a case wherein a reflection preventing film is formed separately from the gap layer. This makes it possible to reduce the number of steps for the manufacture of a thin film magnetic head and to form a magnetic pole layer accurately even in narrow regions.

When the layer having a reflection preventing function that forms a part of the gap layer is made of titanium nitride, since the photoresist is sharply cut, it is possible to prevent scum of the photoresist pattern and to thereby form the magnetic pole layer with high accuracy.

When the insulation layer for defining the throat height is formed by a film made of an inorganic insulating material, it is further possible to prevent positional fluctuation of the insulation layer for defining the throat height, thereby allowing accurate control of the throat height.

The configuration, operation and effects of the present embodiment are otherwise the same as those of the first embodiment.

The present invention is not limited to the above-described embodiments. For example, while each of the above embodiment has referred to a method for manufacturing a composite thin film magnetic head, the invention may be applied also to thin film magnetic heads exclusively used for recording having an induction type magnetic transducer for writing and thin film magnetic heads used for both of recording and reproduction having the transducer. The invention may be applied also to thin film magnetic heads having a structure in which the stacking order of an element for writing and an element is the reverse of the order described above.

It is apparent from the above description that various modes of implementation and modifications are possible for the invention. The present invention may therefore be carried out in modes other than the best modes for carrying out the same within the scope of equivalence of the appended claims.

What is claimed is:

1. A method for forming either of two magnetic pole layers of a thin film magnetic head comprising first and second magnetic pole layers which are magnetically coupled to each other, which include magnetic pole portions being opposite to each other and being placed in regions of the magnetic pole layers on the side of surfaces thereof facing a recording medium and which are each constituted by at least one layer, a gap layer provided between the magnetic pole portion of said first magnetic pole layer and the magnetic pole portion of said second magnetic pole layer and a thin film coil provided such that at least a part thereof is interposed between said first and second magnetic pole layers in a state of insulation from said first and second magnetic pole layers, said method including the steps of:

forming an electrode film used for forming said magnetic pole layer;

forming a reflection preventing film which is conductive and which has a function of preventing reflection of light for exposure at photolithography on said electrode film;

forming a photoresist pattern for forming said magnetic pole layer on said reflection preventing film using photolithography; and forming said magnetic pole layer using said photoresist pattern as a mask.

2. A method according to claim 1, further including the step of removing said reflection preventing film using said photoresist pattern as a mask before the step of forming said one of the magnetic pole layers.

3. A method according to claim 2, wherein reactive ion etching is used at the step of removing said reflection preventing film.

4. A method according to claim 1, wherein said reflection preventing film is made of a non-magnetic material.

5. A method according to claim 4, wherein said reflection preventing film is made of a non-magnetic nitride.

6. A method according to claim 5, wherein said non-magnetic nitride is titanium nitride.

7. A method according to claim 1, wherein said magnetic pole layer is formed on said reflection preventing film at the step of forming said magnetic pole layer.

8. A method according to claim 7, wherein said reflection preventing film is made of a magnetic material.

9. A method according to claim 1, wherein said reflection preventing film is made of a magnetic material.

10. A method for manufacturing a thin film magnetic head comprising first and second magnetic pole layers which are magnetically coupled to each other, which include magnetic pole portions being opposite to each other and being placed in regions of the magnetic pole layers on the side of surfaces thereof facing a recording medium and which are each constituted by at least one layer, a gap layer provided between the magnetic pole portion of said first magnetic pole layer and the magnetic pole portion of said second magnetic pole layer and a thin film coil provided such that at least a part thereof is interposed between said first and second magnetic pole layers in a state of insulation from said first and second magnetic pole layers, said method including the steps of:

forming said first magnetic pole layer;

forming said gap layer on said first magnetic pole layer;

forming said thin film coil on said first magnetic pole layer in an insulated state; and forming said second magnetic pole layer on said thin film coil in an insulated state, the step of forming said second magnetic pole layer including the steps of:

forming an electrode film used for forming said second magnetic pole layer;

forming a reflection preventing film which is conductive and which has a function of preventing reflection of light for exposure at photolithography on said electrode film;

forming a photoresist pattern for forming said second magnetic pole layer on said reflection preventing film using photolithography; and forming said second magnetic pole layer using said photoresist pattern as a mask.

11. A method according to claim 10, further including the step of removing said reflection preventing film using said photoresist pattern as a mask before the step of forming said second magnetic pole layer.

12. A method according to claim 11, wherein reactive ion etching is used at the step of removing said reflection preventing film.

13. A method according to claim 10, wherein said reflection preventing film is made of a non-magnetic material.

14. A method according to claim 13, wherein said reflection preventing film is made of a non-magnetic nitride.

15. A method according to claim 14, wherein said non-magnetic nitride is titanium nitride.

16. A method according to claim 10, wherein said second magnetic pole layer is formed on said reflection preventing film at the step of forming said second magnetic pole layer.

17. A method according to claim 15, wherein said reflection preventing film is made of a magnetic material.

18. A method according to claim 10, wherein said reflection preventing film is made of a magnetic material.

19. A method according to claim 10, further including the step of forming an insulation layer made of an inorganic material for defining a throat height on said first magnetic pole layer, wherein said thin film coil is formed on said insulation layer.

20. A method according to claim 10, further including the step of forming a magnetoresistive element for reading.

21. A thin film magnetic head comprising:

first and second magnetic pole layers which are magnetically coupled to each other, which include magnetic pole portions being opposite to each other and being placed in regions of the magnetic pole layers on the side of surfaces thereof facing a recording medium and which are each constituted by at least one layer;

a gap layer provided between the magnetic pole portion of said first magnetic pole layer and the magnetic pole portion of said second magnetic pole layer;

a thin film coil provided such that at least a part thereof is interposed between said first and second magnetic pole layers in a state of insulation from said first and second magnetic pole layers; and a reflection preventing film which is provided between said gap layer and said second magnetic pole layer, which is conductive and which has a function of preventing the reflection of light for exposure at photolithography.

22. A thin film magnetic head according to claim 21, wherein said reflection preventing film is made of a magnetic material.

23. A thin film magnetic head according to claim 21, wherein the thickness of said reflection preventing film is in the range from 20 to 200 nm.

24. A thin film magnetic head according to claim 21, further comprising an insulation layer provided between said first magnetic pole layer and said thin film coil and made of an inorganic insulating material, for defining a throat height.

25. A thin film magnetic head according to claim 21, further comprising a magnetoresistive element for reading.

26. A thin film magnetic head comprising:

first and second magnetic pole layers which are magnetically coupled to each other, which include magnetic pole portions being opposite to each other and being placed in regions of the magnetic pole layers on the side of surfaces thereof facing a recording medium and which are each constituted by at least one layer;

a gap layer provided between the magnetic pole portion of said first magnetic pole layer and the magnetic pole portion of said second magnetic pole layer; and a thin film coil provided such that at least a part thereof is interposed between said first and second magnetic pole layers in a state of insulation from said first and second magnetic pole layers, the gap layer comprising a layer which is non-magnetic and conductive and which has a reflection preventing function for preventing the reflection of light for exposure at photolithography.

27. A thin film magnetic head according to claim 26, wherein said layer having a reflection preventing function is made of a non-magnetic nitride.

28. A thin film magnetic head according to claim 27, wherein said non-magnetic nitride is titanium nitride.

29. A thin film magnetic head according to claim 26, wherein said gap layer comprises said layer having a reflection preventing function and a non-magnetic insulation layer.

30. A thin film magnetic head according to claim 29, wherein said insulation layer is made of alumina.

31. A thin film magnetic head according to claim 29, wherein said insulation layer is made of aluminum nitride.

32. A thin film magnetic head according to claim 26, wherein the thickness of said layer having a reflection preventing function is in the range from 20 to 200 nm.

33. A thin film magnetic head according to claim 26, further comprising an insulation layer provided between said first magnetic pole layer and said thin film coil and made of an inorganic insulating material, for defining a throat height.

34. A thin film magnetic head according to claim 26, further comprising a magnetoresistive element for reading.

35. A method for manufacturing a thin film magnetic head comprising first and second magnetic pole layers which are magnetically coupled to each other, which include magnetic pole portions being opposite to each other and being placed in regions of the magnetic pole layers on the side of surfaces thereof facing a recording medium and which are each constituted by at least one layer, a gap layer provided between the magnetic pole portion of said first magnetic pole layer and the magnetic pole portion of said second magnetic pole layer and a thin film coil provided such that at least a part thereof is interposed between said first and second magnetic pole layers in a state of insulation from said first and second magnetic pole layers, said method including the steps of:

forming said first magnetic pole layer;

forming said gap layer comprising a layer which is non-magnetic and conductive and which has a reflection preventing function for preventing the reflection of light for exposure at photolithography on said first magnetic pole layer;

forming said thin film coil on said first magnetic pole layer in an insulated state; and forming said second magnetic pole layer on said thin film coil in an insulated state, the step of forming said second magnetic pole layer including the steps of:

forming a photoresist pattern for forming said second magnetic pole layer on said gap layer using photolithography; and forming said second magnetic pole layer using said photoresist pattern as a mask.

36. A method according to claim 35, wherein said layer having a reflection preventing function is made of a non-magnetic nitride.

37. A method according to claim 36, wherein said non-magnetic nitride is titanium nitride.

38. A method according to claim 35, wherein said gap layer comprises said layer having a reflection preventing function and a non-magnetic insulation layer.

39. A method according to claim 38, wherein said insulation layer is made of alumina.

40. A method according to claim 38, wherein said insulation layer is made of aluminum nitride.

41. A method according to claim 35, wherein the thickness of said layer having a reflection preventing function is in the range from 20 to 200 nm.

42. A method according to claim 35, further including the step of forming an insulation layer made of an inorganic material for defining a throat height on said first magnetic pole layer, wherein said thin film coil is formed on said insulation layer.

43. A method according to claim 35, further including the step of forming a magnetoresistive element for reading.

* * * * *